(12) United States Patent
Kida et al.

(10) Patent No.: US 11,938,863 B2
(45) Date of Patent: Mar. 26, 2024

(54) PERIPHERAL IMAGE GENERATION DEVICE AND DISPLAY CONTROL METHOD

(71) Applicant: DENSO CORPORATION, Kariya (JP)

(72) Inventors: Shogo Kida, Kariya (JP); Shinichi Moriyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 39 days.

(21) Appl. No.: 17/455,829

(22) Filed: Nov. 19, 2021

(65) Prior Publication Data
US 2022/0161718 A1 May 26, 2022

(30) Foreign Application Priority Data
Nov. 23, 2020 (JP) ................. 2020-193954

(51) Int. Cl.
B60Q 1/50 (2006.01)
B60Q 1/32 (2006.01)
B60R 1/00 (2022.01)
B60R 11/04 (2006.01)
G06V 20/58 (2022.01)

(52) U.S. Cl.
CPC ............. B60Q 1/50 (2013.01); B60Q 1/326 (2013.01); B60R 1/00 (2013.01); B60R 11/04 (2013.01); G06V 20/58 (2022.01); B60G 2400/50 (2013.01); B60R 2300/105 (2013.01); B60R 2300/303 (2013.01); B60R 2300/305 (2013.01); B60R 2300/607 (2013.01)

(58) Field of Classification Search
CPC ..... B60R 1/00; B60R 11/04; B60R 2300/105; B60R 2300/303; B60R 2300/305; B60R 2300/607; B60R 1/27; B60R 2300/304; B60R 2300/802; G06V 20/58; B60Q 2400/50; B60Q 1/50; B60Q 1/326; G08G 1/166; G08G 1/165; G08G 1/168; H04N 7/181; H04N 5/262; H04N 13/275; H04N 23/90; H04N 23/951
See application file for complete search history.

(56) References Cited

U.S. PATENT DOCUMENTS

2007/0088474 A1* 4/2007 Sugiura ................. B60R 1/00 348/148
2011/0069169 A1* 3/2011 Kadowaki .......... B62D 15/0275 348/148

(Continued)

FOREIGN PATENT DOCUMENTS

JP 3797343 B2 7/2006
JP 2007-43607 A 2/2007
JP 2019-29758 A 2/2019

Primary Examiner — Ryan W Sherwin
(74) Attorney, Agent, or Firm — MASCHOFF BRENNAN

(57) ABSTRACT

A peripheral image generation device acquires a plurality of camera images obtained from a plurality of cameras each of which captures a periphery of the vehicle. The peripheral image generation device stores a traveling direction camera image that is a part or all of images included in the plurality of camera images and captured at least in a traveling direction of the vehicle. The peripheral image generation device generates an underfloor transparent image that is a composite image transmitting a bottom of the vehicle based on the plurality of camera images and the traveling direction camera image.

18 Claims, 12 Drawing Sheets

(56) References Cited

U.S. PATENT DOCUMENTS

| | | | |
|---|---|---|---|
| 2012/0158256 A1* | 6/2012 | Kuboyama | B62D 15/0275 |
| | | | 701/1 |
| 2014/0085466 A1* | 3/2014 | Moriyama | G08G 1/165 |
| | | | 348/148 |
| 2018/0111553 A1 | 4/2018 | Kubota et al. | |
| 2018/0192005 A1* | 7/2018 | Watanabe | H04N 7/181 |
| 2019/0031101 A1* | 1/2019 | Yousefian | G06T 11/60 |
| 2019/0244324 A1 | 8/2019 | Watanabe et al. | |
| 2020/0084395 A1* | 3/2020 | Watanabe | B62D 15/0295 |
| 2020/0169662 A1 | 5/2020 | Watanabe et al. | |
| 2020/0302657 A1 | 9/2020 | Shimazu et al. | |
| 2021/0233290 A1 | 7/2021 | Shimazu et al. | |
| 2023/0154065 A1 | 5/2023 | Shimazu et al. | |

\* cited by examiner

PERIPHERAL IMAGE GENERATION DEVICE AND DISPLAY CONTROL METHOD

CROSS REFERENCE TO RELATED APPLICATION

This application is based on Japanese Patent Application No. 2020-193954 filed on Nov. 23, 2020, the disclosure of which is incorporated herein by reference.

TECHNICAL FIELD

The present disclosure relates to a peripheral image generation device and a display control method for displaying an image of a road surface located under a vehicle body.

BACKGROUND

A technique for displaying an image of a road surface located under a vehicle has been proposed. For example, the road surface image is composited with another camera image by using an image of a front camera acquired when the vehicle is traveling forward. Since the composite image showing the road surface under the vehicle body in this way is an image in which a bottom of the vehicle body is transmitted, it is also referred to as an underfloor transparent image hereafter.

SUMMARY

The present disclosure provides a peripheral image generation device and display control method. The peripheral image generation device acquires a plurality of camera images obtained from a plurality of cameras each of which captures a periphery of the vehicle. The peripheral image generation device stores a traveling direction camera image that is a part or all of images included in the plurality of camera images and captured at least in a traveling direction of the vehicle. The peripheral image generation device generates an underfloor transparent image that is a composite image transmitting a bottom of the vehicle based on the plurality of camera images and the traveling direction camera image.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
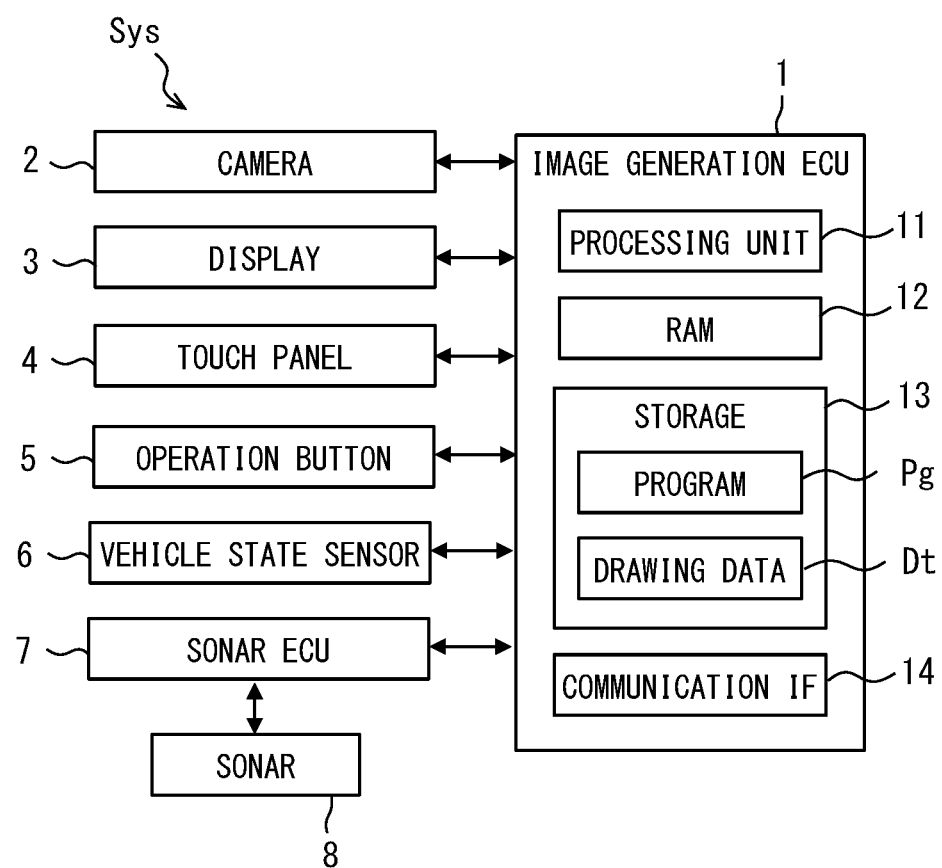
FIG. 1 is a block diagram showing an overall configuration of a peripheral display system.

For example, a vehicle boundary line which indicates a range of a vehicle is not displayed on an underfloor transparent image. In such a configuration, it is difficult for a user to recognize where the vehicle body exists even by looking at the underfloor transparent image. If the user misrecognizes the existence range of the vehicle body, a possibility that the vehicle will be contact with an obstacle increases.

A configuration in which a range of a vehicle is shown with a frame line in a bird's-eye view image, which shows a periphery of the vehicle, has been proposed.

In response to the above described difficulty, a configuration in which a frame line corresponding to a vehicle boundary line is displayed is assumed. However, in the underfloor transmission image, various lines such as a tire boundary line indicating an existence range of a tire and a guide line indicating a predicted trajectory of the vehicle according to a steering angle may be superimposed. It may be difficult to distinguish the vehicle boundary line from other display lines when simply arranging the frame as the vehicle boundary line on the underfloor transmission image. Therefore, it is still difficult for the user to recognize the range in which the vehicle exists.

The present disclosure to provide a peripheral image generation device and a display control method capable of displaying an underfloor transparent image in which a user can easily recognize a range of existence of a vehicle body.

An exemplary embodiment of the present disclosure provides a peripheral image generation device for a vehicle which includes an image acquisition unit, an image storage unit, and a composite image generation unit. The image acquisition unit acquires a plurality of camera images obtained from a plurality of cameras each of which captures a periphery of the vehicle. The image storage unit stores a traveling direction camera image that is a part or all of images included in the plurality of camera images and captured at least in a traveling direction of the vehicle. The composite image generation unit generates an underfloor transparent image that is a composite image transmitting a bottom of the vehicle based on the plurality of camera images and the traveling direction camera image. The composite image generation unit generates, as the underfloor transparent image, an image in which a vehicle boundary line indicating a boundary of a range of a vehicle body is superimposed on an image showing a part or all of ground located under the vehicle, and a decoration having a predetermined pattern is added to the vehicle boundary line.

Another exemplary embodiment of the present disclosure provides a display control method that controls a display of an image for supporting a driving operation of a vehicle. the display control method includes: acquiring a plurality of camera images obtained from a plurality of cameras each of which captures a periphery of the vehicle; storing a traveling direction camera image that is included in the plurality of camera images and captured in a traveling direction of the vehicle; and generating an underfloor transparent image that is a composite image transmitting a bottom of the vehicle based on the plurality of camera images and the traveling direction camera image. The underfloor transparent image is an image in which a vehicle boundary line indicating a boundary of a range of a vehicle body is superimposed on an image showing a part or all of ground located under the vehicle, and a decoration having a predetermined pattern is added to the vehicle boundary line.

In the exemplary embodiment of the present disclosure, the vehicle boundary line is displayed with the decoration having the predetermined pattern added. Since the vehicle boundary line is emphasized by the decoration, the user can easily recognize the range where the vehicle body exists.

Hereinafter, embodiments of a peripheral display system Sys according to the present disclosure will be described with reference to the drawings. The peripheral display system Sys displays an image of a periphery of a vehicle equipped with the system on a display. In the following, a vehicle V equipped with the peripheral display system Sys will also be referred to as a subject vehicle.

The subject vehicle of the present embodiment is, for example, a four-wheel drive vehicle that is assumed to travel not only on a road whose road surface is paved with asphalt or the like (that is, on-road) but also off-road, and has a normal mode and an off-road mode, as driving modes. The normal mode is a driving mode suitable for on-road, and the off-road mode is a driving mode suitable for off-road. Each driving mode has a different method of controlling distribution of driving force to front, rear, left and right wheels. The off-road here mainly refers to a ground with large irregularities such as a rocky road. Of course, off-road can also be understood as ground other than on-road, that is, unmaintained ground. The present disclosure can also be applied to vehicles that are not expected to travel off-road. The subject vehicle may be a vehicle whose drive source is an engine, or may be an electric vehicle or a hybrid vehicle having a motor as a drive source.

In the following explanation, each direction of front-rear, left-right, and up-down is defined with reference to the subject vehicle. Specifically, the front-rear direction corresponds to a longitudinal direction of the subject vehicle. The left-right direction corresponds to a width direction of the subject vehicle. The up-down direction corresponds to a height direction of the subject vehicle. From another point of view, the up-down direction corresponds to a direction perpendicular to a plane parallel to the front-rear direction and the left-right direction. In the present disclosure, a plane perpendicular to the height direction is also referred to as a vehicle horizontal plane. Further, the direction perpendicular to the height direction and which includes the front-rear and left-right directions is also referred to as a horizontal direction of the vehicle. The horizontal direction of the vehicle corresponds to the direction away from the subject vehicle.

In addition, "parallel" in the present disclosure is not limited to a completely parallel state. For example, "parallel" may be inclined about 20 degrees. That is, the term "parallel" includes a substantially parallel state. The expression "vertical" in the present disclosure is not limited to a completely vertical state, but may be inclined about 20 degrees.

(Explanation of Overall Configuration)

FIG. 1 is a diagram showing an example of a schematic configuration of a peripheral display system Sys according to the present disclosure. As shown in FIG. 1, the peripheral display system Sys includes an image generation ECU 1, multiple cameras 2, a display 3, a touch panel 4, an operation button 5, a vehicle state sensor 6, a sonar ECU 7, and multiple sonars 8. The ECU in each name is abbreviation of Electronic Control Unit.

The image generation ECU 1 is communicably connected to each of the multiple cameras 2, the display 3, the touch panel 4, the operation button 5, the vehicle state sensor 6, and the sonar ECU 7. The multiple sonars 8 are connected to the sonar ECU 7. The various devices or sensors described above and the image generation ECU 1 may be individually connected by a dedicated line, or may be connected via an in-vehicle network which is a communication network constructed in the vehicle. For example, the camera 2 and the image generation ECU 1 may be directly connected by a dedicated video signal line.

The image generation ECU 1 generates a composite image of a vehicle peripheral area viewed from an arbitrary viewpoint based on the image data input from each camera 2 as an image for supporting the driving operation of the vehicle V, and displays the generated image on the display 3. The image generation ECU 1 corresponds to a peripheral image generation device. The image generation ECU 1 is realized by use of a computer. That is, the image generation ECU 1 includes a processing unit 11, a RAM 12, a storage 13, an I/O 14, a bus line connecting these configurations, and the like.

The processing unit 11 is hardware (in other words, an arithmetic core) for arithmetic processing combined with the RAM 12. The processing unit 11 is, for example, a CPU. The processing unit 11 accesses the RAM 12 to execute various processes for providing the functions of respective functional blocks. The RAM 12 is a volatile storage medium.

The storage 13 includes a non-volatile storage medium such as a flash memory. The storage 13 stores an image generation program Pg as firmware and various drawing data for the composite image generation unit F7 to generate a composite image. The drawing data includes data indicating the shape of a projection surface TS, which will be described later, data of a 3D model of an appearance of the subject vehicle, data of a 3D model of a predetermined component of the subject vehicle, and the like. Examples of components for which 3D model data are prepared include a tire, a steering wheel, an instrument panel, a pillar, and a body panel. The execution of the image generation program Pg by the processing unit 11 corresponds to an execution of a display control method, which is a method corresponding to the image generation program Pg. The I/O 14 is a circuit module for communicating with another device. The I/O 14 may be implemented by use of an analogue circuit element, an IC, or the like. The detail of the image generation ECU 1 will be described later.

Figure 2:
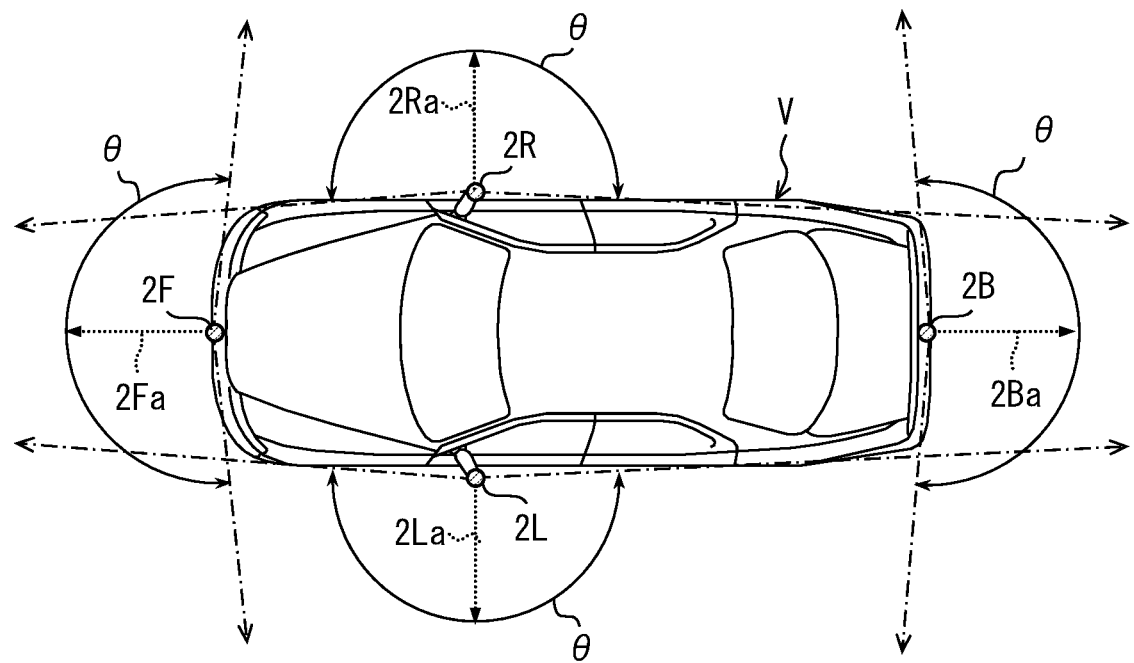
FIG. 2 is a diagram showing an example of an installation position and a capturing range of each camera 2.

The camera 2 is an in-vehicle camera that captures the surroundings of the subject vehicle and outputs the data of the captured image to the image generation ECU 1. Each camera 2 includes at least a lens and an image sensor, and electronically acquires an image showing the periphery of the subject vehicle. Each of the multiple cameras 2 is attached to a predetermined position of the subject vehicle in a predetermined attitude so as to capture different range with each other. The peripheral display system Sys of the present embodiment includes a front camera 2F, a rear camera 2B, a left side camera 2L, and a right side camera 2R as the cameras 2 as shown in FIG. 2. These four cameras 2 are arranged at different positions in the subject vehicle and capture different directions around the subject vehicle. The following describes specific examples.

The front camera 2F is a camera that captures an image of the front of the vehicle at a predetermined angle of view. The front camera 2F is attached to the front end of the subject vehicle, such as a front grill, with its optical axis 2F facing the front of the subject vehicle. The rear camera 2B is a camera that captures an image of the rear of the vehicle at a predetermined angle of view. The rear camera 2B is arranged at a predetermined position on the rear surface of the vehicle body, such as near the rear license plate or the rear window, in an attitude in which the optical axis 2Ba is directed to the rear of the subject vehicle. The left side camera 2L is a camera that captures the left side of the subject vehicle. The left side camera 2L is attached to the left side mirror with the optical axis 2La facing the left side of the subject vehicle. The right side camera 2R is a camera that captures the right side of the subject vehicle. The right side camera 2R is attached to the right side mirror with its optical axis 2Ra facing the right side of the subject vehicle.

A wide-angle lens such as a fisheye lens is adopted as the lens for each camera 2, and each camera 2 has an angle of view 8 of 180 degrees or more. Therefore, by using the four cameras 2, it is possible to take a picture of the entire circumference of the subject vehicle. The mounting position of each camera 2 described above can be changed as appropriate. The front camera 2F may be attached to a rearview mirror, an upper end of the windshield, or the like. The right side camera 2R or the left side camera 2L may be arranged near the base of the A pillar or the B pillar. The peripheral display system Sys may include a camera 2 mounted on the roof. Some or all of the cameras 2 may be cameras retrofitted on the roof, on the dashboard, near the window frame, or the like.

Data indicating the mounting position and attitude of each camera 2 in the vehicle V (hereinafter, mounting position data) is stored in the storage 13. The mounting position of each camera 2 may be represented as, for example, a point on three-dimensional coordinates (hereinafter, vehicle three-dimensional coordinate system) centered on an arbitrary position of the vehicle V. The X axis forming the vehicle three-dimensional coordinate system may be, for example, an axis parallel to the left-right direction of the vehicle. Further, the Y axis may be an axis parallel to the front-rear direction. The Z axis may be an axis parallel to the height direction. It is assumed that the right direction of the vehicle corresponds to the positive direction of the X axis, the front of the vehicle corresponds to the positive direction of the Y axis, and the upper direction of the vehicle corresponds to the positive direction of the Z axis. The center of the vehicle three-dimensional coordinate system may be, for example, the center of the rear wheel axle.

The display 3 is provided with a thin display panel such as a liquid crystal display, and is a device for displaying various information and images. The display 3 is arranged on an instrument panel or the like of the subject vehicle so that the user can visually recognize the screen. The display 3 may be integrated with the image generation ECU 1 by being arranged in the same housing as the image generation ECU 1. Of course, the display 3 may be a device separate from the image generation ECU 1. The display 3 includes a touch panel 4 stacked on the display panel, and is able to accept user operations. The touch panel 4 is, for example, a capacitive touch panel, and outputs a signal indicating a user's touch position. The user here mainly refers to a driver's seat occupant (so-called driver). In addition to the driver, the user may include a passenger in the passenger seat and the like.

The operation button 5 is an operation member that receives a user's operation on the display content of the display 3. The operation button 5 is a switch for displaying the composite image generated by the image generation ECU 1 on the display 3 and changing the virtual viewpoint of the composite image. The operation button 5 is provided on the steering wheel of the subject vehicle, for example, and mainly receives an operation from the driver. The user can perform various operations on the peripheral display system Sys via the operation buttons 5 and the touch panel 4. When the user operates any of the operation buttons 5 and the touch panel 4, an operation signal indicating the content of the operation is input to the image generation ECU 1. The operation button 5 can also be called a multi-information switch. The operation button 5 may be arranged on the instrument panel.

The peripheral display system Sys may include a travel mode switch as an operation member for the driver to switch the driving mode of the vehicle V to the off-road mode. The operation member for switching the driving mode may be a dial type. The shift lever may have a function as a driving mode switch.

The vehicle state sensor 6 is a sensor that detects the amount of state related to the traveling control of the subject vehicle. The vehicle state sensor 6 includes a shift sensor, a vehicle speed sensor, a steering angle sensor, an acceleration sensor, and the like. The shift sensor is a sensor that detects the shift position, in other words, the setting state of the transmission. The vehicle speed sensor is a sensor that detects a traveling speed of the subject vehicle. The steering angle sensor is a sensor that detects the rotation angle of the steering wheel (so-called steering angle). The acceleration sensor is a sensor that detects acceleration in at least one of the vehicle front-rear direction, the left-right direction, and the up-down direction acting on the subject vehicle. Here, it is assumed that a 3-axis acceleration sensor is adopted as the acceleration sensor. The detected value of the acceleration sensor may be used for determining the vehicle attitude with respect to the horizontal plane. The type of sensor used for the peripheral display system Sys as the vehicle state sensor 6 may be appropriately designed, and it is not necessary to include all the above-mentioned sensors. Further, the vehicle height sensor, the gyro sensor, the azimuth angle sensor, and the like may be included in the vehicle state sensor 6. Each sensor outputs data indicating the present value (that is, the detection result) of the physical state quantity to be detected to the image generation ECU 1.

The sonar ECU 7 is an ECU that controls the operation of the sonar 8. The sonar 8 transmits ultrasonic waves as exploration waves, and receives the reflected waves reflected by the ultrasonic waves to detect an object existing around the subject vehicle. Further, the sonar 8 detects the distance from the sonar 8 to the object based on the time from the transmission of the ultrasonic wave to the return as the reflected wave. The distance information of the object detected by each sonar 8 is input to the image generation ECU 1 via, for example, the sonar ECU 7.

Figure 3:
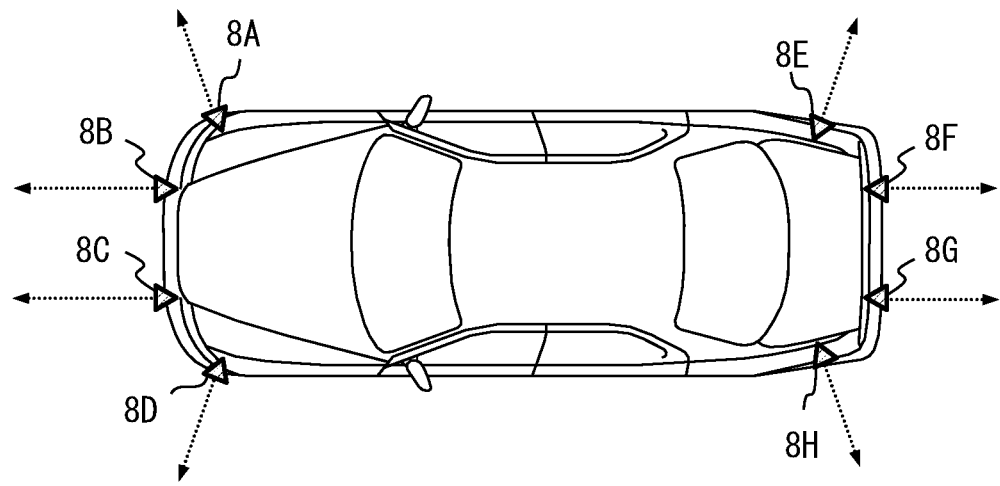
FIG. 3 is a diagram showing an example of an installation position and a capturing range of each sonar 8.

In this embodiment, as an example, eight sonars 8 are provided as shown in FIG. 3. Specifically, four sonars 8A to 8D are dispersedly arranged from the right corner portion to the left corner portion of the front bumper. Further, four sonars 8E to 8H are dispersedly arranged from the right corner portion to the left corner portion of the rear bumper of the subject vehicle. With such an arrangement of the sonars 8, the sonar ECU 7 is capable of detecting an object existing in front of or behind the subject vehicle. The arrangement of the sonars 8 is an example, and is not limited to the example shown in FIG. 3. Further, the sonar 8 may be attached to a side sill, a fender, or a door panel so as to emit ultrasonic waves toward the side of the vehicle.

In addition, the sonar ECU 7 is capable of identifying the relative position of an object existing around the subject vehicle by combining the detection results of the multiple sonars 8. For example, as the direction of the detected object, the direction of the object relative to the subject vehicle is derived based on the distance to the same object detected by each of the two or more sonars 8. When the sonar 8 detects an object, the sonar ECU 7 inputs data indicating the direction and distance of the object to the image generation ECU 1 as a detection result. Further, the sonar ECU 7 may determine the height of the detected object by analyzing the reflection intensity and the received waveform, and output the position and height information as the detected object information to the image generation ECU 1. The sonar ECU 7 may be integrated with the image generation ECU 1.

(Configuration of Image Generation ECU)

Figure 4:
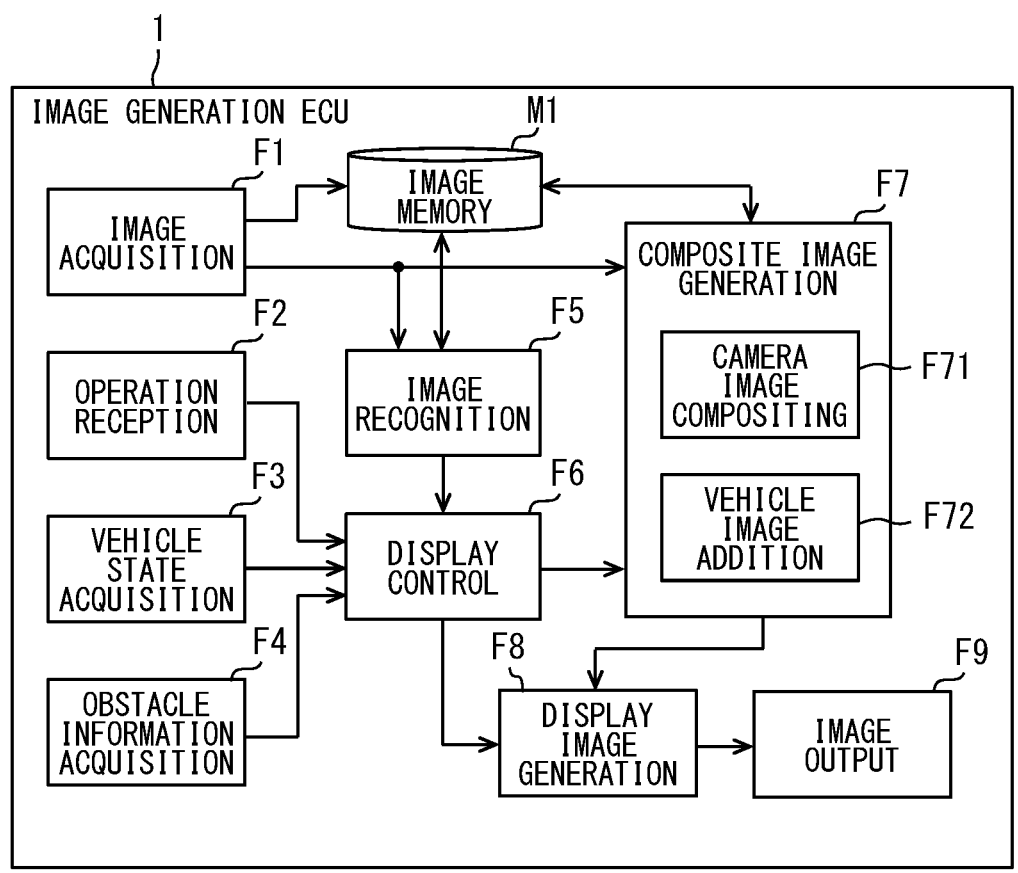
FIG. 4 is a block diagram showing functions of an image generation ECU 1.

As shown in FIG. 4, the image generation ECU 1 includes, as functional units, an image acquisition unit F1, an operation reception unit F2, a vehicle state acquisition unit F3, an obstacle information acquisition unit F4, an image recognition unit F5, a display control unit F6, a composite image generation unit F7, a display image generation unit F8, and an image output unit F9. Further, the image generation ECU 1 includes an image memory M1 which is a memory for temporarily storing image data. The image memory M1 is realized by using, for example, a part of the storage area included in the RAM 12. In the image memory M1, the position information and the orientation information of the vehicle V at the time of capturing the image may be stored in association with the image of each camera. The image memory M1 corresponds to an image storage unit.

The image acquisition unit F1 acquires a camera image which is an image generated by each of the four cameras 2. By combining the images of the cameras 2, image data for the entire circumference of the subject vehicle is obtained. The image acquisition unit F1 converts the image signal input from the camera 2 into digital image data in a predetermined data format, and then outputs the image signal to the image recognition unit F5 and the composite image generation unit F7.

Further, for example, each time the subject vehicle moves a predetermined storage distance, the image acquisition unit F1 stores, associated with the position information and the vehicle body attitude information of the subject vehicle separately acquired, in the image memory M1. The storage distance may be, for example, 0.1 m, 0.3 m, 0.5 m, or the like. The image acquisition unit F1 may store, for example, the captured image data of the front camera 2F which includes the ground from immediately below the front end of the vehicle to 3 m ahead in the image memory M1 when the vehicle is traveling forward. Further, when the vehicle is traveling backward, the image acquisition unit F1 may store the captured image data of the rear camera 2B which includes ground from immediately below the rear end of the vehicle to 3 m behind in the image memory M1.

In addition, various modes can be adopted as the storage mode of the image data in the image memory M1. For example, the image acquisition unit F1 overwrites and saves new data in the oldest updated area in the image memory M1. That is, the image memory M1 may be configured as a ring buffer. The ring buffer is a storage area logically arranged in a ring shape. The image acquisition unit F1 may store image frames acquired within the most recent predetermined time in a region different from the above-described image data for each fixed distance. The new image data stored in the image memory M1 is referred to by the composite image generation unit F7 and the display image generation unit F8. The image acquisition unit F1 may store the image acquired from the camera 2 after performing image processing such as distortion correction, enlargement or reduction, or cropping according to the lens characteristics on the image acquired from the camera 2.

The operation reception unit F2 receives the operation signal output from the operation button 5 and the touch panel 4. The operation signal is a signal indicating the content of the user's operation on the operation button 5 and the touch panel 4. As a result, the operation reception unit F2 receives the user's instruction operation for displaying the composite image or the camera image. The operation reception unit F2 inputs data corresponding to the received operation signal to the display control unit F6.

The vehicle state acquisition unit F3 acquires information indicating the state of the subject vehicle from other devices provided in the subject vehicle, such as the vehicle state sensor 6. The vehicle state acquisition unit F3 acquires the shift position, the acceleration for each detection axis direction, the vehicle speed, the steering angle, and the like from various sensors. The vehicle state acquisition unit F3 may acquire various state quantities from other ECUs. For example, information such as the steering angle may be acquired from an ECU constituting the steering system. Further, the vehicle state acquisition unit F3 may acquire the movement distance, the amount of change in the direction, and the like with respect to a predetermined time before from the image recognition unit F5. That is, the vehicle state acquisition unit F3 may acquire various information related to the state of the subject vehicle from not only the sensor but also another ECU, the image recognition unit F5, and the like. Further, the vehicle state acquisition unit F3 may combine multiple types of information to calculate the traveling distance of the vehicle, the amount of change in the direction of the vehicle body, and the like. The direction of the vehicle may include not only the direction in which the vehicle is facing (so-called yaw angle) but also the pitch angle, roll angle, and the like.

The obstacle information acquisition unit F4 acquires information about a three-dimensional object existing around the vehicle from the sonar ECU 7. That is, the size, height, relative position, and the like of the detected three-dimensional object are acquired. Further, when the sonar ECU 7 is provided with a discriminator that identifies the type of the detected object, such as a low profile object or an obstacle, by analyzing the feature amount of the signal waveform of the received reflected wave, the identification result of the detected object by sonar ECU 7 is also acquired. The low profile object here is a three-dimensional object having a height of a predetermined value (for example, 4 cm) or less, and conceptually refers to a three-dimensional object that the vehicle V can overcome. For example, the low profile object refers to a rocky area where the amount of protrusion from the road surface is less than a predetermined threshold value, a flap plate placed in a parking lot, or the like. Further, the obstacle here is conceptually a three-dimensional object that the vehicle V should avoid. For example, the obstacle refers to a rock having a height that makes contact with the body of the vehicle V, a guardrail, a wall, or another moving body. Other moving objects may include bicycles, pedestrians, animals, or the like, in addition to other vehicles. The obstacle information acquisition unit F4 may perform so-called sensor fusion, which detects an object by combining the information from the sonar ECU 7 and the recognition result by the image recognition unit F5.

The image recognition unit F5 detects the position of a predetermined detection target, its type, and the like by analyzing the image input from the camera 2. The image recognition unit F5 has a function as a discriminator for identifying the type of an object based on, for example, an image feature vector. The image recognition unit F5 may identify an object by using, for example, Convolutional Neural Network (CNN) or Deep Neural Network (DNN) technology to which deep learning is applied. The detection target includes pedestrians, other vehicles, road markings such as lane markings that can be given to paved roads, or road edges. In addition to the line as a lane marker, the lane marking line can include a line indicating a parking frame or the like.

Further, the image recognition unit F5 may estimate the amount of movement and the amount of change in the orientation of the subject vehicle based on the amount of change in the position of the feature points appropriately set on the image between the image frames. For example, the image recognition unit F5 may estimate the current position with respect to a certain reference point, the amount of change in the orientation of the vehicle body, the yaw rate or the like by using an optical flow method or the like, which is a kind of inter-frame difference method. Optical flow is information that shows the movement of an object reflected in image data as a vector. The object recognition result and the estimation result of the subject vehicle position of the image recognition unit F5 and the like are output to the display control unit F6, the vehicle state acquisition unit F3, the composite image generation unit F7, the display image generation unit F8, and the like.

The display control unit F6 comprehensively controls the entire image generation ECU 1. For example, the display control unit F6 controls the composite image generation unit F7 and the display image generation unit F8 based on the information input from the operation reception unit F2 and the vehicle state acquisition unit F3, and causes the composite image generation unit F7 and the display image generation unit F8 to generate the composite image and the display image DP corresponding to the traveling state of the subject vehicle and the setting of the user.

The display control unit F6 determines whether the traveling direction of the subject vehicle is the forward direction or the backward direction based on, for example, a signal from the shift sensor or the rotation direction of the tire. The display control unit F6 may determine whether the traveling environment is off-road based on the input signal from the driving mode switch.

Figure 5:
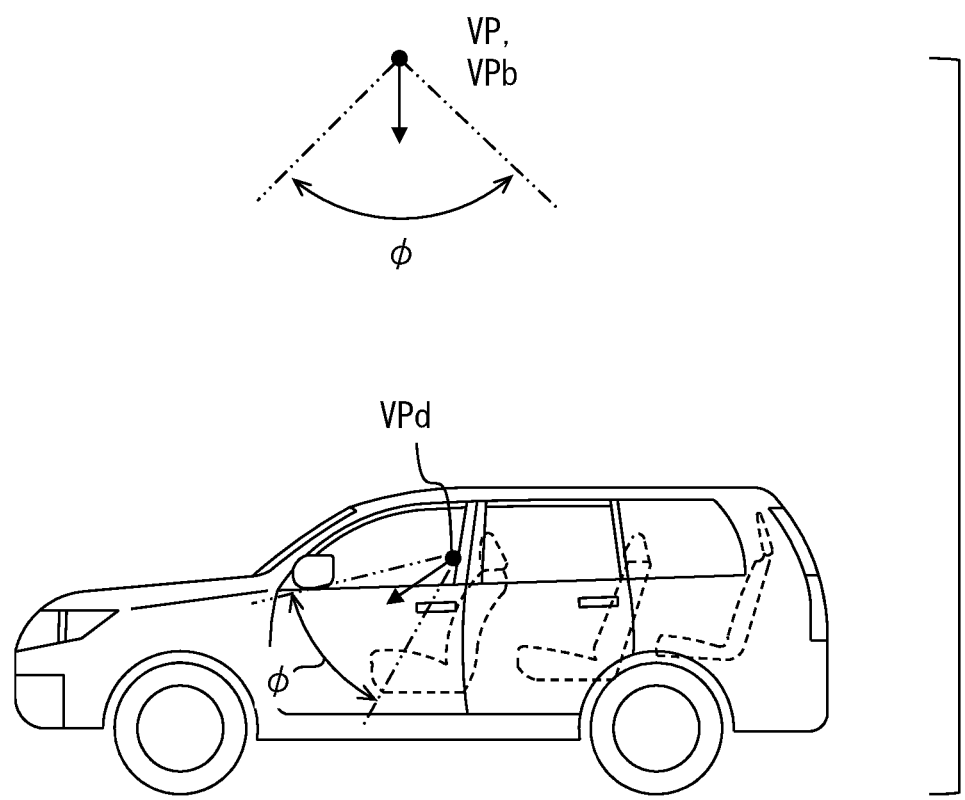
FIG. 5 is a diagram showing a virtual viewpoint VP.

Further, the display control unit F6 set the position and the visual line direction of a virtual viewpoint VP for generating a composite image described later based on at least one of the traveling direction of the subject vehicle, the signal from the touch panel 4, and the signal from the operation button 5. As the virtual viewpoint VP that may be set, for example, as shown in FIG. 5, a bird's-eye view VPb, a driver viewpoint VPd, and the like can be adopted. The bird's-eye view VPb is a setting pattern of a virtual viewpoint VP in which the viewpoint position is directly above the subject vehicle and the viewing direction is directly below. The bird's-eye view VPb is applied when a bird's-eye view image which is an image of the subject vehicle and its surroundings from directly above the vehicle is generated. The viewing angle $\varphi$ of the bird's-eye view VPb can be appropriately adjusted so as to include a predetermined range around the vehicle. The viewpoint position of the bird's-eye view VPb is not limited to directly above the vehicle, and may be a position shifted from directly above the vehicle to the rear side, the front side, or the lateral direction. The bird's-eye view VPb corresponds to an example of an outdoor viewpoint in which the virtual viewpoint VP is arranged outside the vehicle interior.

The driver viewpoint VPd is a virtual viewpoint VP in which the viewpoint position is set to the assumed position of the driver's eyes in the vehicle interior. The visual line direction of the driver viewpoint VPd can be set diagonally forward and downward so as to include the vicinity of the front wheels, for example. The diagonally downward direction may be, for example, a direction directed downward by about 20 to 30° from the horizontal plane of the vehicle. The visual line direction of the driver viewpoint VPd may be changed to an arbitrary direction based on a user operation (for example, swipe) on the touch panel 4 while using the forward diagonally downward direction as a reference direction. The viewing angle $\varphi$ of the driver viewpoint VPd can also be appropriately adjusted so as to include a predetermined range near the front wheels. For example, the viewing angle $\varphi$ of the driver viewpoint VPd can be 100 degrees in the horizontal direction, 60 degrees in the vertical direction, or the like.

The assumed position of the driver's eyes is set, for example, near the headrest of the driver's seat. As the assumed position of the driver's eyes, an eyelips set for each vehicle type can be used. The eyelips is a virtual space area defined for each vehicle type. The eyelips is in a virtual ellipsoidal form defined based on an eye range that statistically represents a spatial distribution of the eye point of an occupant. The driver viewpoint VPd corresponds to an example of the vehicle interior viewpoint in which the virtual viewpoint VP is arranged in the vehicle interior. Further, the position of the driver viewpoint VPd may be arranged at a position deviated from the assumed position of the driver's eyes. For example, the driver viewpoint VPd may be arranged at a position deviated from the assumed position of the driver's eyes by a predetermined amount, for example, at a position intermediate between the driver's seat and the passenger seat.

The image generation ECU 1 of the present embodiment includes an underfloor display mode as an operation mode for displaying an underfloor transparent image CP which is a composite image in which the bottom of the vehicle body is transmitted. The display control unit F6 may switch the display mode based on at least one of the shift lever being set to a predetermined position and the user operation. The display control unit F6 sets the display mode to the underfloor display mode, for example, based on the fact that the transparent underfloor display condition described later is satisfied. The display control unit F6 causes the composite image generation unit F7 to generate the underfloor transparent image CP in the underfloor display mode. The underfloor transparent image CP generated in a state where the virtual viewpoint VP is set to the driver viewpoint VPd is also hereinafter referred to as a driver viewpoint image CPd.

The composite image generation unit F7 performs image processing for generating a composite image such as an underfloor transparent image CP. The composite image generation unit F7 projects data of the multiple camera images onto a virtual projection surface TS corresponding to the periphery of the subject vehicle, and generates the composite image that indicates the periphery of the subject vehicle as seen from the virtual viewpoint VP using the data on the projection surface.

Figure 6:
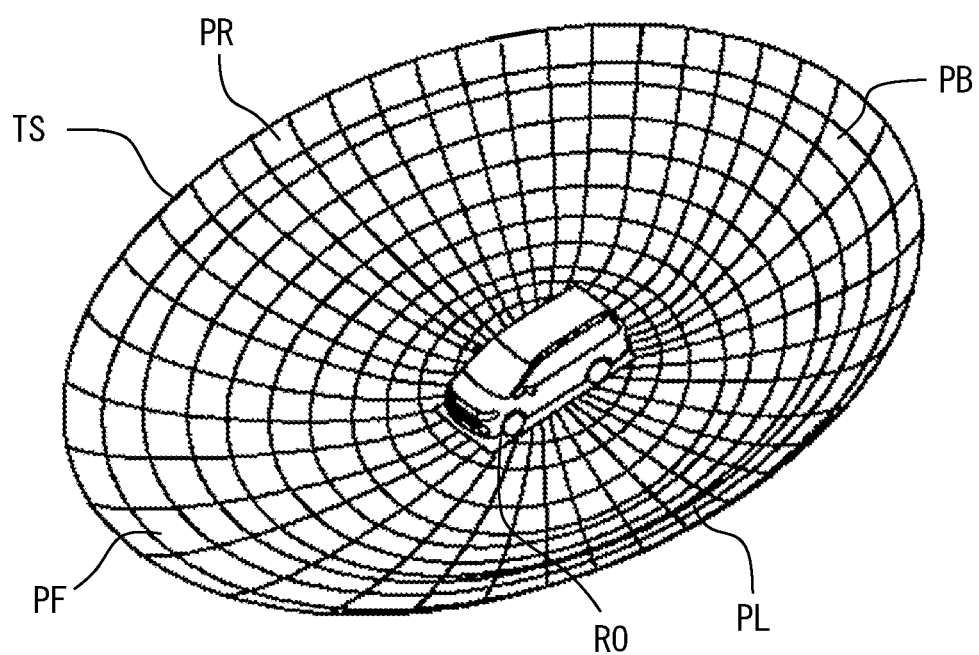
FIG. 6 is a diagram showing a projection surface TS.

As conceptually shown in FIG. 6, the projection plane TS is a virtual three-dimensional plane corresponding to the peripheral region of the subject vehicle. The central region of the projection surface TS is defined as a vehicle region R0, which is the position of the subject vehicle. The vehicle area R0 is set as, for example, a rectangular flat surface portion. The vehicle area R0 is set to include an area that overlaps with the subject vehicle in top view, in other words, an area that cannot be directly imaged by the camera 2. For example, the projection surface TS is formed as a plane along the horizontal direction of the vehicle in the vicinity of the vehicle area R0, and has a bowl shape having a downwardly convex curved surface in which the inclination (gradient) increases as the distance from the vehicle area R0 increases. Which part of the camera image is projected on each part of the projection surface TS is associated with the corresponding information such as table data. Projecting a camera image on the projection surface TS corresponds to texture mapping the camera image on the projection surface TS.

The shape of the projection surface TS may be changed as appropriate. For example, the entire region of the projection surface TS may be set to a horizontal plane. Further, the projection surface TS may have a shape in which a curved surface region that is convex downward from the edge portion of the vehicle region R0 starts, in other words, a shape that does not have a plane region around the vehicle region R0.

The operation of the composite image generation unit F7 is controlled by the display control unit F6. For example, the virtual viewpoint VP used to generate the composite image is controlled by the display control unit F6. The composite image generation unit F7 includes a camera image composite unit F71 and a vehicle image addition unit F72 as sub-functions. The camera image compositing unit F71 projects each camera image onto the projection surface TS described above. The vehicle image addition unit F72 arranges an image of the vehicle V at a predetermined position on the projection surface TS on which the camera image is projected. Details of the camera image compositing unit F71 and the vehicle image addition unit F72 will be described later.

The display image generation unit F8 generates a display image DP for displaying on the display 3. The display image generation unit F8 generates the display image DP including the composite image and the camera image by using the composite image generated by the composite image generation unit F7 and the camera image acquired by the image acquisition unit F1. The combination of images included in the display image DP is determined by the display control unit F6 according to the traveling direction of the subject vehicle and the user operation on the touch panel 4 or the like. That is, the operation of the display image generation unit F8 is controlled by the display control unit F6.

The image output unit F9 converts the display image DP generated by the display image generation unit F8 into a video signal in a predetermined signal format, outputs the signal to the display 3, and displays the display image DP on the display 3. As a result, a composite image showing the periphery of the subject vehicle as seen from the virtual viewpoint VP is displayed on the display 3.

(Method for Generating Composite Image)

Hereinafter, the operation when the composite image generation unit F7 generates the underfloor transparent image CP will be described. When the underfloor display condition described later is satisfied, the camera image compositing unit F71 projects the data (value of each pixel) included in each camera image input from the image acquisition unit F1 on the projection surface TS in a virtual three-dimensional space. The projection position of each camera image with respect to the projection surface TS is associated in advance with corresponding information such as table data.

For example, the camera image compositing unit F71 projects the image data of the front camera 2F onto a front region PF of the projection surface TS, and projects the image data of the rear camera 2B onto a rear region PB of the projection surface TS. Further, the camera image compositing unit F71 projects the image data of the left side camera 2L onto a left side area PL of the projection surface TS, and projects the image data of the right side camera 2R onto a right side area PR of the projection surface TS. Regarding an overlapping area, which is an area that is captured by two cameras in an overlapping manner, a method of blending the images taken by the two cameras at a predetermined ratio or a method of connecting the images taken by the two cameras at a predetermined boundary line may be adopted.

Further, based on the instruction from the display control unit F6, the image of a portion where the vehicle area R0 is estimated to be located is extracted from the past image data stored in the image memory M1 and the extracted image is projected after rotation correction and the like is performed. The image projected on the vehicle area R0 is referred to as an underfloor image hereafter since the image projected on the vehicle area R0 is an image of the area currently located directly under the subject vehicle, that is, an image under the floor.

Figure 7:
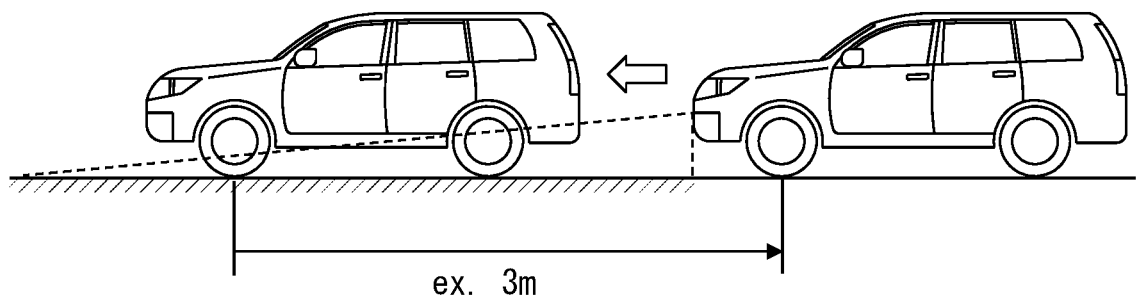
FIG. 7 is a diagram showing an image data used for generating an underfloor transparent image.

For example, when the subject vehicle is traveling forward, as shown in FIG. 7, the underfloor image is generated using the captured image of the front camera 2F captured 3*m* behind the current position. When the subject vehicle is traveling backward, the underfloor image is generated using the rear camera image captured 3*m* ahead of the current position. That is, the underfloor image is generated using an image when the subject vehicle is located at a predetermined distance to the opposite side of the traveling direction from the current position. When the subject vehicle is traveling forward, the underfloor image may be generated using front camera images captured at multiple time points from the time when the vehicle is located 3*m* behind the current position to the current position. The same can be applied when the vehicle is traveling backward. The image data projected on the vehicle area R0 (in other words, the underfloor portion) may be updated as needed as the vehicle V travels.

Next, the composite image generation unit F7 sets the virtual viewpoint VP in the three-dimensional space including the projection surface TS under the control of the display control unit F6. The composite image generation unit F7 is capable of setting the virtual viewpoint VP directed to an arbitrary visual field direction at an arbitrary viewpoint position in the three-dimensional space.

Then, the vehicle image addition unit F72 arranges various image elements about the subject vehicle on the virtual three-dimensional space including the projection surface TS on which the camera image is projected. When the virtual viewpoint VP is arranged outside the vehicle interior such as the bird's-eye view VPb, the vehicle image addition unit F72 adds a vehicle boundary line Lvc indicating the road surface range where the vehicle body exists, a tire boundary line Lt indicating the road surface range where the tire exists, and the like. The vehicle boundary line Lvc is a line showing an outline of a region formed by projecting the vehicle body perpendicularly to the road surface, and corresponds to a line showing the outer shape of the vehicle V from the bird's-eye view. Similarly, the tire boundary line Lt is a line showing an outline of a region formed by projecting the tire perpendicularly to the road surface (that is, orthographic projection), and corresponds to a line showing the outer shape of the tire from the bird's-eye view. The vehicle image addition unit F72 of the present embodiment add a predetermined decorative image Ef to the vehicle boundary line Lvc. The display state of each of the vehicle boundary line Lvc, the decorative image Ef, the tire boundary line Lt, and the like is controlled by the display control unit F6. Details of the vehicle boundary line Lvc, the decorative image Ef, and the tire boundary line Lt will be described later.

Further, when the virtual viewpoint VP is arranged in the vehicle interior such as the driver viewpoint VPd, the composite image generation unit F7 arranges a 3D tire model, a 3D body model, and a 3D interior model and the like in addition to the vehicle boundary line Lvc and the tire boundary line Lt at predetermined positions in the three-dimensional space. The 3D tire model is a 3D model of the tire and is set to be semi-transparent as a whole. The 3D tire model may be composed of only opaque or semi-transparent contour lines. That is, the portion other than the contour line of the 3D tire model may be set to be colorless and transparent.

The semi-translucency here is not limited to a state where the transparency is 50%, and may include, for example, a state where the transparency is 80%. In other words, the expression semi-transparent can include a level that vaguely indicates its existence. Transparency is a parameter indicating that the higher the value, the more transparent it is. In the present disclosure, a state where the transparency is 100% means a completely transparent state. The transparency or opacity of an image element is a concept corresponding to the alpha value of a pixel. Generally, the degree of transparency gets higher with increase of the alpha value.

The 3D body model is a 3D model of the vehicle body and is set to be semi-transparent as a whole. The 3D body model may be composed of only opaque or semi-transparent contour lines. That is, the portion other than the contour line of the 3D body model may be set to be colorless and transparent. The 3D interior model is a 3D model such as an instrument panel, a steering wheel, an A pillar, or the like.

The 3D tire model, the 3D body model, the 3D interior model, and the like are 3D models showing the constituent members of the subject vehicle, and may be called constituent member models. The 3D model arranged in the three-dimensional space for generating the composite image may be changed as appropriate, and for example, the arrangement of the 3D tire model, the 3D body model, the 3D interior model, and the like may be omitted.

In addition, the vehicle image addition unit F72 may draw a scale line indicating a point separated from the vehicle end by a predetermined distance or a vehicle width line indicating the vehicle width. Further, the vehicle image addition unit F72 may draw a planned track line, which is a line indicating a planned traveling track according to the steering angle of the vehicle V, as other image elements related to the vehicle V. The vehicle width line may also serve as a planned track line. The vehicle boundary line Lvc, the tire boundary line Lt, the planned traveling track line, and the like may be called a vehicle information image because they are images showing information about the vehicle V. In addition, the planned track line, the scale line, the vehicle width line, and the like may also function as information for guiding the driver's driving operation. Therefore, the display line such as the planned track line may also be called a guide line. The guide line may also include the vehicle boundary line Lvc and the tire boundary line Lt.

Then, the composite image generation unit F7 renders various image elements existing in the three-dimensional space including the projection plane TS according to the virtual viewpoint VP, and cuts out an image element included in a predetermined viewing angle when viewed from the virtual viewpoint VP. As a result, the composite image generation unit F7 generates a composite image showing the area under the floor of the subject vehicle and the area around the subject vehicle as seen from the virtual viewpoint VP. That is, as the underfloor transparent image CP, the composite image generation unit F7 generates the composite image in which the bottom of the vehicle body is transparent. As described above, as an example, the composite image is generated in the order of projecting the camera image on the projection surface TS and then adding the vehicle image. However, the individual processes may be executed in parallel.

In addition, various methods can be adopted as a method for generating a composite image. For example, the road surface image generated based on the camera image, the vehicle boundary line Lvc, the tire boundary line Lt, and the image of the three-dimensional model of the members constituting the vehicle may be arranged in different layers and processed individually. For example, the composite image may be generated in combination with a camera image layer which is a layer including an image of the projection surface TS on which the camera image is projected, a boundary line layer which is a layer on which a vehicle boundary line, a tire boundary line, and the like are arranged, and a 3D model layer including an image of a three-dimensional model. In this case, the camera image layer may be the lowest layer (background side), and the boundary line layer and the 3D model layer may be superposed on the camera image layer. Of course, the layer structure can also be changed as appropriate. When each image element is handled individually by using the multiple layers, the image in which each layer is finally integrated becomes the composite image.

(Vehicle Boundary Line Lvc and Decorative Image Ef)

Figure 8:
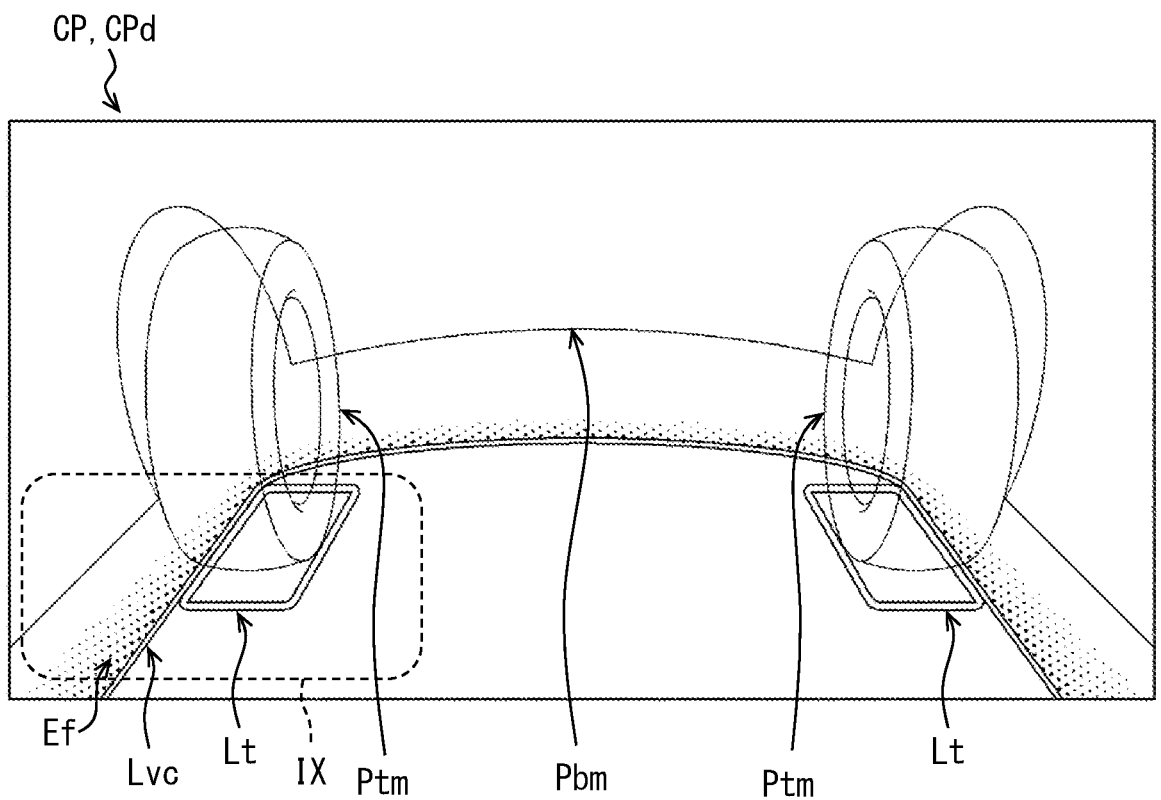
FIG. 8 is a diagram showing an example of the underfloor transparent image.
Figure 9:
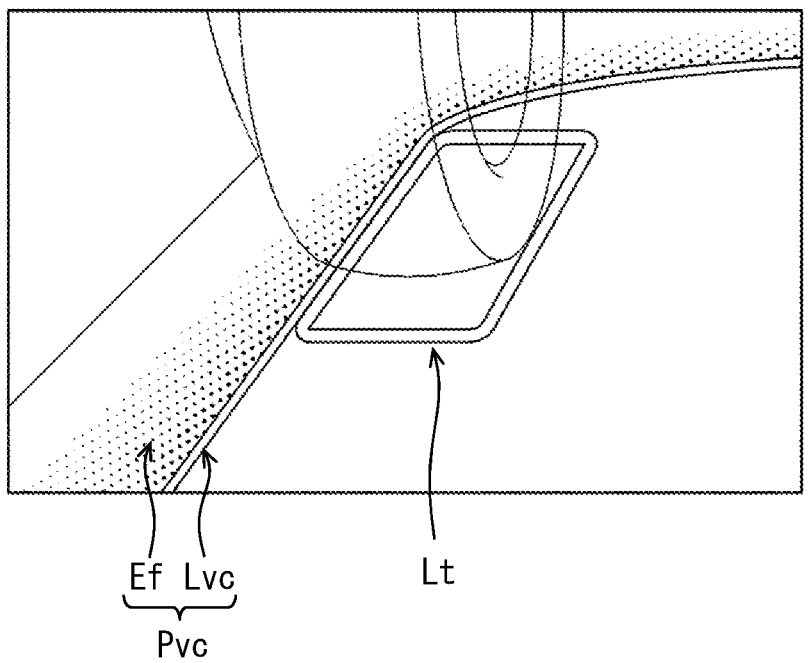
FIG. 9 is an enlarged view of a region surrounded by a broken line in FIG. 8.

The image generation ECU 1 of the present embodiment generates an image in which the decorative image Ef such as a gradation or a shadow is added to the vehicle boundary line Lvc. Here, the vehicle boundary line Lvc and the decorative image Ef will be described with reference to FIG. 8 and the like. FIG. 8 is a diagram showing an example of the driver viewpoint image CPd generated by the composite image generation unit F7 of the present embodiment. FIG. 9 is an enlarged view of the vicinity of the left front wheel shown in FIG. 8.

In addition to the vehicle boundary line Lvc and the tire boundary line Lt, the example shown in FIGS. 8 and 9 includes a tire model image Ptm, a body model image Pbm, and the like. Various model images are Computer Graphics (CG) or Computer Generated Imagery (CGI) when a 3D tire model corresponding to the front wheels, a 3D body model, and the like are viewed from the driver's viewpoint VPd. Of course, the tire model image Ptm and the body model image Pbm are arbitrary elements and may be omitted by user setting or the like. For example, the tire model image Ptm and the body model image Pbm may be hidden in the driver viewpoint image CPd based on the settings of the designer or user of the image generation ECU 1.

The vehicle boundary line Lvc is a line image drawn on the vehicle area R0. The vehicle boundary line Lvc is a line indicating a range on the road surface where the vehicle V exists. The thickness of the vehicle boundary line Lvc (in other words, the width Wx) is set to a thickness corresponding to, for example, 4 cm on the road surface. The length in the real space may be converted into a length in the virtual space based on the ratio of the size of the vehicle body in the virtual space including the projection plane TS to the size of the vehicle body in the real space. The thickness of the vehicle boundary line Lvc displayed on the display 3 as the underfloor transparent image CP may be adjusted according to the distance from the virtual viewpoint VP.

The thickness of the vehicle boundary line Lvc may be equivalent to 3 cm or 2 cm in the real space. Further, the vehicle boundary line Lvc may have a thickness equivalent to 6 cm or 8 cm in the real space. The visibility of the vehicle boundary line Lvc is improved with the vehicle boundary line Lvc being thicker. However, when the vehicle boundary line Lvc is made thicker, the portion where the camera image is hidden by the line increases. That is, when displayed as a composite image, the area of the road surface that can be visually recognized by the user based on the composite image becomes smaller. Therefore, it is preferable that the thickness of the vehicle boundary line Lvc is set to a value corresponding to less than 5 cm in the real space.

The color of the vehicle boundary line Lvc can be changed as appropriate, and is set to blue so that the vehicle boundary line Lvc can be easily distinguished from the actual color of the road surface, for example. Dark colors such as black are easily assimilated with asphalt, and bright colors such as white are easily assimilated with gravel roads and lane markings given on the road surface. The color of the vehicle boundary line Lvc is set so as to enhance the visibility of the vehicle boundary line Lvc by the driver in consideration of various road surface hues.

Figure 10:
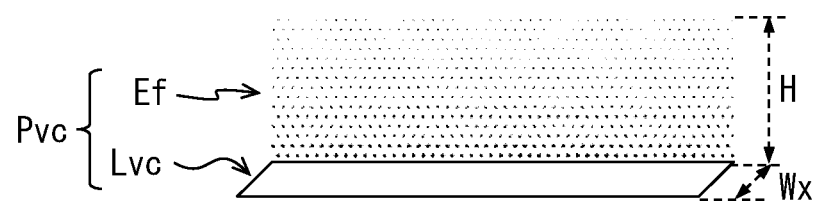
FIG. 10 is a schematic diagram showing a decorative image Ef.
Figure 11:
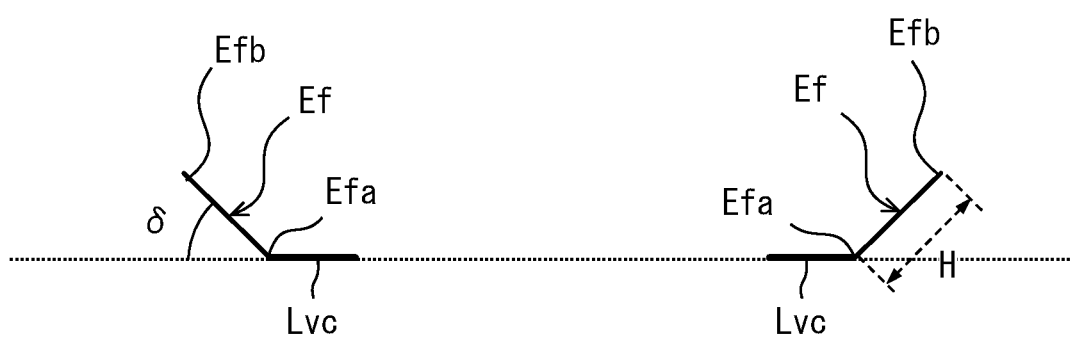
FIG. 11 is a diagram showing a decorative image Ef added to a vehicle boundary line Lvc.

The decorative image Ef is a decorative image element for enhancing the visibility of the vehicle boundary line Lvc. In other words, the decorative image Ef is an ancillary image element for highlighting the vehicle boundary line Lvc. The decorative image Ef is formed in a strip shape having a predetermined width, for example. As shown in FIG. 10, the decorative image Ef is arranged so that one edge thereof is along the vehicle boundary line Lvc. FIG. 10 is a schematic diagram for explaining the configuration of the vehicle boundary line Lvc and the decorative image Ef shown in FIGS. 8 and 9. As shown in FIG. 11, the decorative image Ef may be arranged so as to extend outward from the vehicle boundary line Lvc in a manner inclined by about 45 degrees with respect to the vehicle horizontal plane. The decorative image Ef may extend from the outer edge of the vehicle boundary line Lvc toward the vehicle height direction (that is, directly above).

An extension angle δ, which is an angle formed by the decorative image Ef with respect to the vehicle horizontal plane, can be appropriately set in the range of 0 degrees to 90 degrees. That is, the decorative image Ef is provided so as to extend from the vehicle boundary line Lvc toward the outside or directly above the vehicle boundary line Lvc. Between edges of the decorative image Ef, an edge opposite to a connection edge Efa that is connected to the vehicle boundary line Lvc is defined as an open edge Efb. When the extension angle δ is set to 1 degree or more, the open edge Efb floats from the road surface. The decorative image Ef may face the inside of the vehicle boundary line Lvc, and the extension angle δ may be set to 91 degrees or more, for example, 120 degrees.

The color of the decorative image Ef may be the same color as the vehicle boundary line Lvc. The decorative image Ef is set to have lower transparency as it is closer to the vehicle boundary line Lvc, and higher transparency as it is farther from the vehicle boundary line Lvc. That is, the decorative image Ef is a band shape image having a gradation that becomes transparent as the distance from the vehicle boundary line Lvc increases. In FIG. 10, the gradation is shown by a dot pattern. The transparency gets lower as the density of the dot pattern increases. The transparency gets higher as the density of the dot pattern decreases. For example, the transparency of a portion of the decorative image Ef connected to the vehicle boundary line Lvc is set to about 50%, and the end portion on the distant side is set to 100% or the like. The degree of change in transparency according to the distance from the vehicle boundary line Lvc, which forms the gradation, may be in the form of a linear function or in the form of a quadratic function. The degree of change in color tone can be changed as appropriate.

An extension length H of the decorative image Ef, which is the length in the direction away from the vehicle boundary line Lvc, is set to be the same as, for example, the width Wx of the vehicle boundary line Lvc or longer than the width Wx of the vehicle boundary line Lvc. For example, the extension length H is set to about 5 to 8 cm in the real space. Further, the extension length H may be set to a length obtained by multiplying the width Wx of the vehicle boundary line Lvc by a predetermined extension coefficient. The extension coefficient may be, for example, 1.2 or 1.5. Further, the extension length H may be set shorter than the width Wx of the vehicle boundary line Lvc. For example, the extension length H may be set to 0.8 times the width Wx of the vehicle boundary line Lvc. The extension length H may also be understood as the width of the decorative image Ef itself. The extension length H may also be understood as the height of the decorative image Ef in one aspect. The decorative image Ef that provides the gradation and extends radially from the vehicle boundary line Lvc described above is an image such as a curtain or an aurora extending upward or outward from the vehicle boundary line Lvc.

According to the aspect of displaying the underfloor transparent image CP in which the decorative image Ef is added to the vehicle boundary line Lvc as described above, the visibility of the vehicle boundary line Lvc can be enhanced. Further, since the decorative image Ef is set to be semi-transparent, the possibility that the road surface cannot be seen due to the decorative image Ef can be reduced. The vehicle boundary line Lvc and the decorative image Ef can be collectively interpreted as the vehicle outline image Pvc. The vehicle boundary line Lvc in the vehicle outline image Pvc can be called a main body or a main line. Further, the decorative image Ef in the vehicle outline image Pvc can be called a decorative portion.

(Tire Boundary Line Lt)

The tire boundary line Lt is a line indicating a road surface range in which the tire (in other words, wheel) of the vehicle V exist. The tire boundary line Lt is set thinner than the vehicle boundary line Lvc. For example, the thickness of the tire boundary line Lt is set to about half of the vehicle boundary line Lvc. Specifically, the thickness of the tire boundary line Lt is set to a thickness corresponding to, for example, 2 cm on the road surface. By setting the tire boundary line Lt narrower, the driver can easily see the road surface directly under the tire and in the vicinity of the tire.

Further, a color of the tire boundary line Lt is set to a color different from that of the vehicle boundary line Lvc. For example, the color of the tire boundary line Lt can be set to yellow or orange. Of course, the color of the tire boundary line Lt is set so as to enhance the visibility of the driver in consideration of various road surface colors, as in the case of the vehicle boundary line Lvc.

For example, the tire boundary line Lt may have a color located on the opposite side of the color of the vehicle boundary line Lvc in the color wheel (so-called complementary color) or a color adjacent thereto. By using the color of the tire boundary line Lt as a complementary color for the vehicle boundary line Lvc, it is possible to make the narrowly formed tire boundary line Lt stand out. The complementary color of blue is orange, and the colors adjacent to orange include yellow and red.

On the other hand, from another viewpoint, the color of the tire boundary line Lt may be similar to the color of the vehicle boundary line Lvc. For example, when the vehicle boundary line Lvc is blue, the tire boundary line Lt may be, for example, light blue or dark blue. Since both the vehicle boundary line Lvc and the tire boundary line Lt are line images showing information indicating the current position of the vehicle, the sense of unity can be enhanced by using these similar colors. Further, as the composite image, an object to be taken care such as an obstacle existing around the vehicle may be highlighted by surrounding the object with a frame of a color such as red or orange. Based on such a configuration, the presence of lines of various colors on the image raises a concern that it causes visual annoyance to the user. Based on such circumstances, by using similar colors for the vehicle boundary line Lvc and the tire boundary line Lt, the user can distinguish a line indicating information about the vehicle and a line indicating information about a peripheral object.

In the above, an example of the case where the virtual viewpoint VP is set to the driver viewpoint VPd is shown, but the vehicle boundary line Lvc and the tire boundary line Lt described above are also displayed when the bird's-eye view viewpoint VPb is set. In the bird's-eye view image, the decorative image Ef of the vehicle boundary line Lvc may be displayed in a manner of being attached to the road surface plane.

Figure 12:
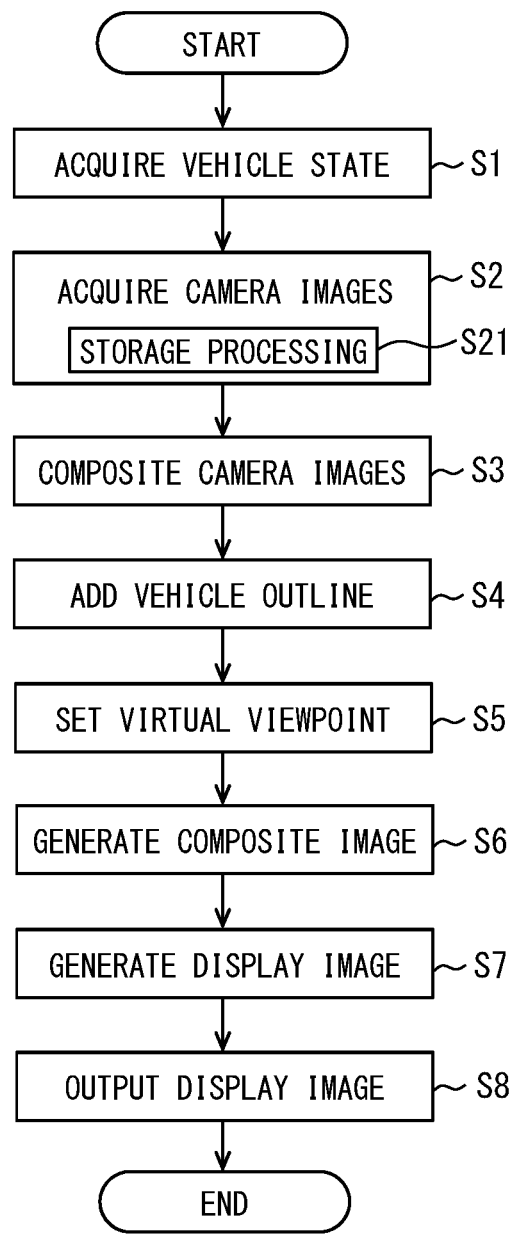
FIG. 12 is a flowchart showing an operation flow of the image generation ECU 1.

The flow of the underfloor transparent image display processing, which is a series of processes executed when the image generation ECU 1 displays the underfloor transparent image CP, will be described with reference to the flowchart shown in FIG. 12. The flowchart shown in FIG. 12 is started when a predetermined underfloor display condition is satisfied. The underfloor display condition may be a condition for displaying the underfloor transparent image CP. For example, the image generation ECU 1 determines that the underfloor display condition is satisfied when the operation button 5 is pressed by the user. In addition, the image generation ECU 1 determines that the underfloor display condition is satisfied when a predetermined user operation for displaying the underfloor transparent image CP is performed via the touch panel 4. That is, this flow can be started based on the fact that the operation reception unit F2 has acquired a signal indicating that an operation for displaying the composite image has been performed.

The items constituting the underfloor display condition may include a shift position, a vehicle speed, and the like. For example, at least one of the shift position being set to a predetermined range and the vehicle speed being less than a predetermined low speed threshold value may be included in the underfloor display condition. For example, an image generation condition may include that the shift position is set to the low range and that the shift position is set to the backward position. The low speed threshold value may be, for example, 10 km/h, 15 km/h, 20 km/h, or the like. In addition, when the operation reception unit F2 receives the viewpoint switching operation via the touch panel 4 or the like while the front camera image or the rear camera image is displayed on the display 3, it is determined that the underfloor display condition is satisfied.

Further, the processing flow shown in FIG. 12 may be repeatedly executed in a predetermined cycle (for example, a 1/30 second cycle) until a predetermined display termination condition is satisfied. The display termination condition may be, for example, a case where the shift position is set to a range other than the predetermined range, a case where the vehicle speed exceeds a predetermined threshold value, a case where the operation button 5 is pressed again, and the like. In addition, the image generation ECU 1 may determine that the display termination condition is satisfied when an operation for terminating the display of the underfloor transparent image CP is performed via the touch panel 4.

Here, as an example, it is assumed that the underfloor transparent image display processing includes S1 to S8. Of course, the number of steps and the processing order constituting the underfloor transparent image display processing can be changed as appropriate.

First, in S1, the vehicle state acquisition unit F3 acquires information indicating the state of the subject vehicle such as the shift position and the vehicle speed, and the processing proceeds to S2. Such a process can be called a vehicle state acquisition step.

In S2, the image acquisition unit F1 acquires four camera images obtained by the four cameras 2, and the processing proceeds to S3. Such a process can be called an image acquisition step. Further, S2 includes S21 as a finer step. In S21, based on the information acquired in S1, it is determined whether the vehicle V has traveled for a predetermined storage distance since the image captured by the camera 2 on the traveling direction side was stored last time. When the moving distance from the previous storage of the camera image is equal to or longer than the storage distance, the image captured by the camera 2 on the traveling direction side is stored in the image memory M1.

That is, S21 corresponds to a step of storing the image captured by the camera 2 on the traveling direction side in the image memory M1 each time the vehicle V travels for the storage distance. The image acquisition unit F1 stores at least an image captured by the camera 2 on the traveling direction side as the first storage process when the state in which the image generation condition is not satisfied transitions to the state in which the image generation condition is satisfied. Such a process can be called an image storage step.

In S3, the camera image compositing unit F71 maps the captured image of each camera 2 to a predetermined position on the projection surface TS as described above. Further, the camera image compositing unit F71 maps the image of the road surface area corresponding to the current vehicle position to the vehicle area R0 by using the image data captured in the past stored in the image memory M1. Upon completion of this process, the processing proceeds to S4. When an image that can be projected on the vehicle area R0 has not yet been accumulated, such as immediately after the start of this flow, an opaque image such as black may be arranged in the vehicle area R0 as a floor image. Such a process can be called an image composite step.

In S4, the vehicle image addition unit F72 arranges the vehicle boundary line Lvc and the tire boundary line Lt at predetermined positions in the vehicle area R0, and the processing proceeds to S5. In S4, a 3D tire model, a 3D body model, or the like may be arranged at a predetermined position above the vehicle area R0. Further, in S4, a planned track line, a scale line, a vehicle width line, or the like may be drawn as another image element. In S4, since information indicating the current state of the vehicle is added to the composite image, it can be called a vehicle information addition step.

In S5, the composite image generation unit F7 sets a virtual viewpoint VP for generating the composite image under the control of the display control unit F6. For example, when the composite image generation unit F7 generates the underfloor transparent image CP for the first time after the traveling power is turned on, the default setting of the virtual viewpoint VP may be the position and the visual line direction preset by the designer or the user. The default setting may be, for example, the driver viewpoint VPd whose visual line direction is directed diagonally forward and downward. In addition, the setting of the virtual viewpoint VP set in S5 may be the position and direction of the virtual viewpoint VP when the underfloor transparent image CP is displayed last time. In that case, as a preparatory process, the display control unit F6 stores the setting data of the virtual viewpoint VP when the underfloor transparent image CP is displayed last time in the RAM 12 or the storage 13.

Further, the position and the visual line direction of the virtual viewpoint VP may be determined according to the traveling direction of the subject vehicle. For example, when the traveling direction of the subject vehicle is the forward direction, the driver viewpoint VPd whose visual line direction is directed diagonally forward and downward as described above is adopted as the virtual viewpoint VP. On the other hand, when the traveling direction of the subject vehicle is the backward direction, for example, the driver viewpoint VPd whose visual line direction is directed diagonally backward and downward may be adopted as the virtual viewpoint VP. In addition, the visual line direction of the virtual viewpoint VP may be adjusted in a direction according to the steering angle. Further, the composite image generation unit F7 may cause the display control unit F6 to acquire the position and direction of the virtual viewpoint VP specified by the user via the touch panel 4 or the like, and to set the virtual viewpoint VP of the specified position and direction.

Here, as an example, it is assumed that the driver viewpoint VPd whose visual line direction is directed diagonally forward and downward is applied as the virtual viewpoint VP. Such a process can be called a visual viewpoint setting step. When S5 is completed, the processing proceeds to S6.

In S6, the composite image generation unit F7 generates the underfloor transparent image CP viewed from the virtual viewpoint VP set in S6. Here, as an example, the composite image generation unit F7 generates the driver viewpoint image CPd that shows the ground near the front wheels by transmitting the bottom and body of the vehicle as the underfloor transparent image CP. The data of the underfloor transparent image CP generated by the composite image generation unit F7 is output to the display image generation unit F8. Such a process can be called a composite image generation step. When the process in S6 is completed, the processing proceeds to S7.

Figure 13:
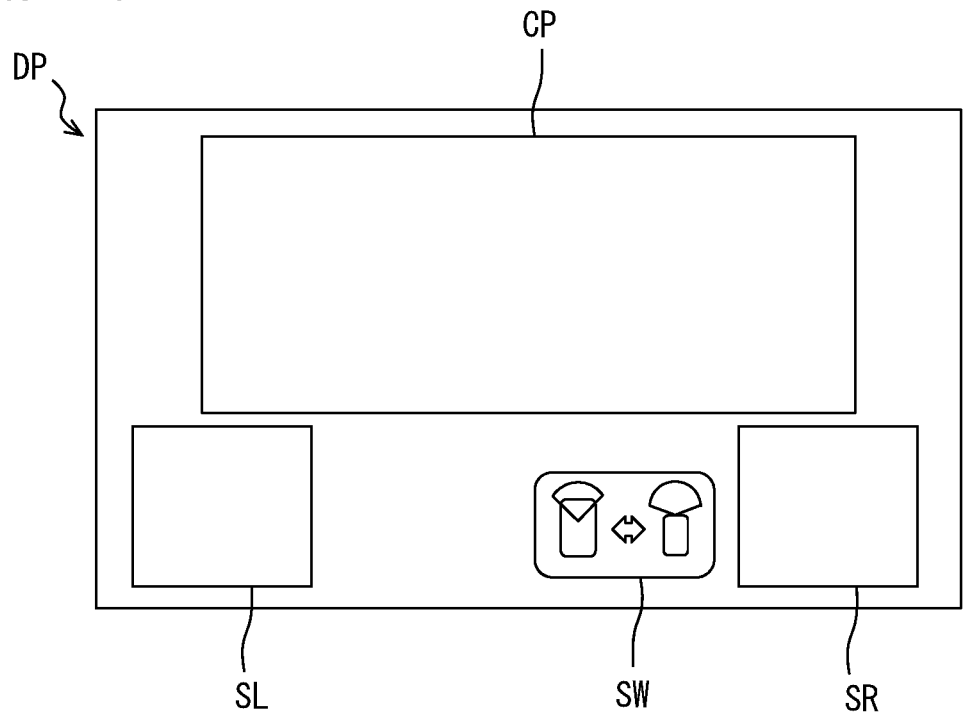
FIG. 13 is a diagram showing an example of a configuration of a display image DP.

In S7, the display image generation unit F8 generates the display image DP including the underfloor transparent image CP generated by the composite image generation unit F7. For example, the display image generation unit F8 generates an image including, as the display image DP, a driver viewpoint image CPd, a right side camera image SR, a left side camera image SL, and a viewpoint changeover switch image SW, as shown in FIG. 13. Specifically, the driver viewpoint image CPd is arranged above the central region of the display image DP, and the viewpoint changeover switch image SW is arranged below the center region. The right side camera image SR is arranged on the right side of the driver viewpoint image CPd, and the left side camera image SL is arranged on the left side of the driver viewpoint image CPd. According to such a layout of the display image DP, it is possible to visually notify the driver of the left and right situations while maintaining good visibility of the driver viewpoint image CPd by the user. That is, by looking at the display image DP, the driver can recognize the state of the ground near the front wheels and the state of the sides of the vehicle.

The viewpoint changeover switch image SW included in the display image DP is an image that functions as a switch for switching the display content as the display image DP when touched by the user. Whether or not the user touches the viewpoint changeover switch image SW can be determined based on the touch position signal output from the touch panel 4. When the user's touch operation to the viewpoint changeover switch image SW is detected, the display image generation unit F8, for example, changes the image to be displayed in the image center area from the driver viewpoint image CPd to the front camera image according to the instruction from the display control unit F6. The viewpoint changeover switch image SW may switch the virtual viewpoint VP from the driver viewpoint VPd to the bird's-eye view VPb. In that case, for example, the display image generation unit F8 generates an image including a bird's-eye view image transmitted under the floor as the display image DP. The data of the display image DP generated by the display image generation unit F8 is output to the image output unit F9. S7 can be called a display image generation step.

In S8, the image output unit F9 converts the digital data of the display image DP generated by the display image generation unit F8 into a signal of a predetermined signal format and outputs the digital data to the display 3. As a result, the display image DP including the driver viewpoint image CPd is displayed on the display 3. S8 can be called a display image output step.

The above control is an example, and the display image generation unit F8 may select a camera image according to the traveling direction of the subject vehicle and generates the display image DP by using the camera image under the control of the display control unit F6. For example, when the traveling direction is the backward direction, the rear camera image may be arranged in the central region of the display image DP. Further, the display control unit F6 may change the combination and layout of the images to be displayed on the display image DP, the display range of the camera image, and the like based on the operation signal received by the operation reception unit F2.

(Effect)

According to the above configuration, the underfloor transparent image CP showing the periphery of the vehicle is generated while transmitting the components of the vehicle V such as the instrument panel and the bottom of the vehicle body. The underfloor transparent image CP corresponds to an image in which the vehicle boundary line Lvc and the tire boundary line Lt are superimposed on the image of the subject existing directly under the vehicle and around the vehicle. By confirming such an underfloor transparent image CP, the user can confirm the state of the surroundings of the subject vehicle from the viewpoint of the vehicle interior and can intuitively grasp the state of the surroundings of the subject vehicle.

Further, the user can easily recognize the distance from the vehicle body to a three-dimensional object such as a rock, a curb, or a flap plate existing in the vicinity of the vehicle based on the vehicle boundary line Lvc included in the underfloor transparent image CP. Therefore, it is possible to reduce the risk of the vehicle body coming into contact with the three-dimensional object unintentionally. Further, according to the configuration including the tire boundary line Lt in the underfloor transparent image CP, the user can easily recognize the positions of the vehicle body and the tire with respect to a lane marking, curb, rock, or the like located under the vehicle body. As a result, for example, during off-road driving, it is possible to perform detailed driving operation such as placing a tire on the target rock. In addition, even during on-road driving, it becomes easier to perform detailed driving operation such as moving the vehicle body toward the road edge so that the tires do not hit the curb.

In addition, the image generation ECU 1 of the present embodiment displays the vehicle boundary line Lvc in which the decorative image Ef such as a gradation is added to the vehicle boundary line Lvc. According to this configuration, the visibility of the vehicle boundary line Lvc can be enhanced. Further, while the decorative image Ef such as a gradation is added to the vehicle boundary line Lvc, the other display lines are displayed without decoration such as a gradation (in other words, an effect). According to such a configuration, it is possible to suppress the possibility that the vehicle boundary line Lvc is mistaken for another display line based on the presence or absence of decoration. Another display line here may include a tire boundary line Lt, a planned track line, a scale line, a vehicle width line, or the like.

The line may be thickened without adding decoration for making the vehicle boundary line Lvc stand out. However, if the vehicle boundary line Lvc is made thicker, the portion where the road surface is hidden by the vehicle boundary line Lvc increases. Further, if the vehicle boundary line Lvc is made thicker, the range in which the vehicle actually exists may be unclear. If the boundary line is too thick, it is difficult for the user to determine where the end of the actual vehicle V on the boundary line is, that is, it is difficult for the user to determine whether the end of the vehicle V is located on at the outer edge, center, or inner edge of the boundary line. On the other hand, according to the above described configuration, the thickness of the vehicle boundary line Lvc remains thin and can be made conspicuous. That is, according to the above described configuration, the vehicle boundary line Lvc can be emphasized without hiding the camera image more than necessary. In addition, it is possible to reduce the possibility that the range in which the vehicle actually exists becomes unclear.

The effect of this embodiment has been described by taking the case where the driver viewpoint VPd with the visual line direction directed forward is applied as the virtual viewpoint VP of the composite image. The same effect can be obtained when the visual line direction is directed to another direction such as rearward, lateral, or diagonally lateral. Further, the same effect can be obtained when the virtual viewpoint VP is arranged at an arbitrary position in the vehicle interior other than the driver viewpoint VPd. In addition, the same effect can be expected when the virtual viewpoint VP is set on the outer surface of the vehicle V or in the area near the vehicle outside the vehicle interior. The area near the vehicle here refers to a region within 0.2 m from the outer surface of the vehicle, for example. The outer surface may include a back surface portion, a front end portion, and a roof in addition to the left and right side surface portions. A door panel, fender, pillar, and the like can be included in the side surface portion.

While the embodiments of the present disclosure have been described above, the present disclosure is not limited to the embodiments described above, and various modifications to be described below are included in the technical scope of the present disclosure, and may be implemented by various modifications within a scope not departing from the spirit described below. For example, various modifications to be described below can be implemented in combination as appropriate within a scope that does not cause technical inconsistency. Note that members having the same functions as those described in the above embodiment are denoted by the same reference numerals, and a description of the same members will be omitted. When only a part of the configuration is described, the configuration described in the above embodiment can be applied to the other part.

(Decorative Image Ef)

Figure 14:
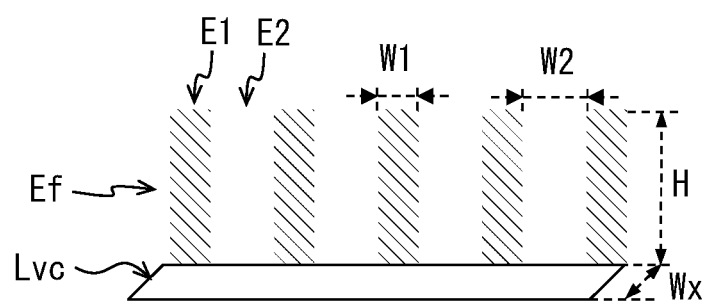
FIG. 14 is a diagram showing a modified example of the decorative image Ef.

The decorative image Ef is used as a gradation image, however the decorative image Ef may be an image having a vertical stripe pattern as shown in FIG. 14. The vertical stripe pattern is formed, for example, by alternately arranging, along the vehicle boundary line Lvc, a colored translucent portion (hereinafter, colored portion E1) and a colorless portion E2 which is a colorless and semi-transparent portion. The vertical stripe pattern can include a zebra pattern. The colored portion E1 corresponds to a first part, and the colorless portion E2 corresponds to a second part. The second part may be relatively transparent as compared with the first part, and may not be colorless and transparent.

The width W1 of the colored portion E1 may be set to a value of about 1 to 4 times the width Wx of the vehicle boundary line Lvc. For example, the width W1 of the colored portion E1 is set to three times the width Wx of the vehicle boundary line Lvc. The width W2 of the colorless portion E2 is set to the similar size to the width W1 of the colored portion E1. The width W2 of the colorless portion E2 may be larger than the width W1 of the colored portion E1. The width W2 of the colorless portion E2 may be set to be twice the width W1 of the colored portion E1. The width W2 of the colorless portion E2 defines the spacing between the colored portions E1. The area where the camera image is hidden by the decorative image Ef becomes small with the increase of the width W2 of the colorless portion E2, so that the visibility of the road surface by the user can be improved.

Figure 15:
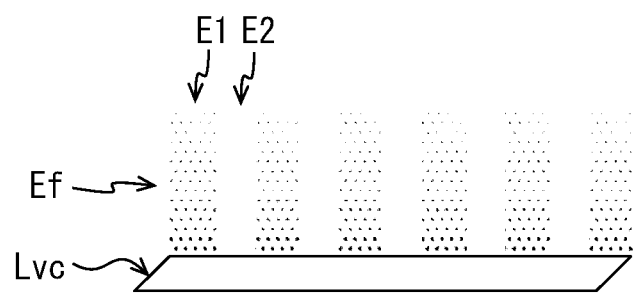
FIG. 15 is a diagram showing a modified example of the decorative image Ef.
Figure 16:
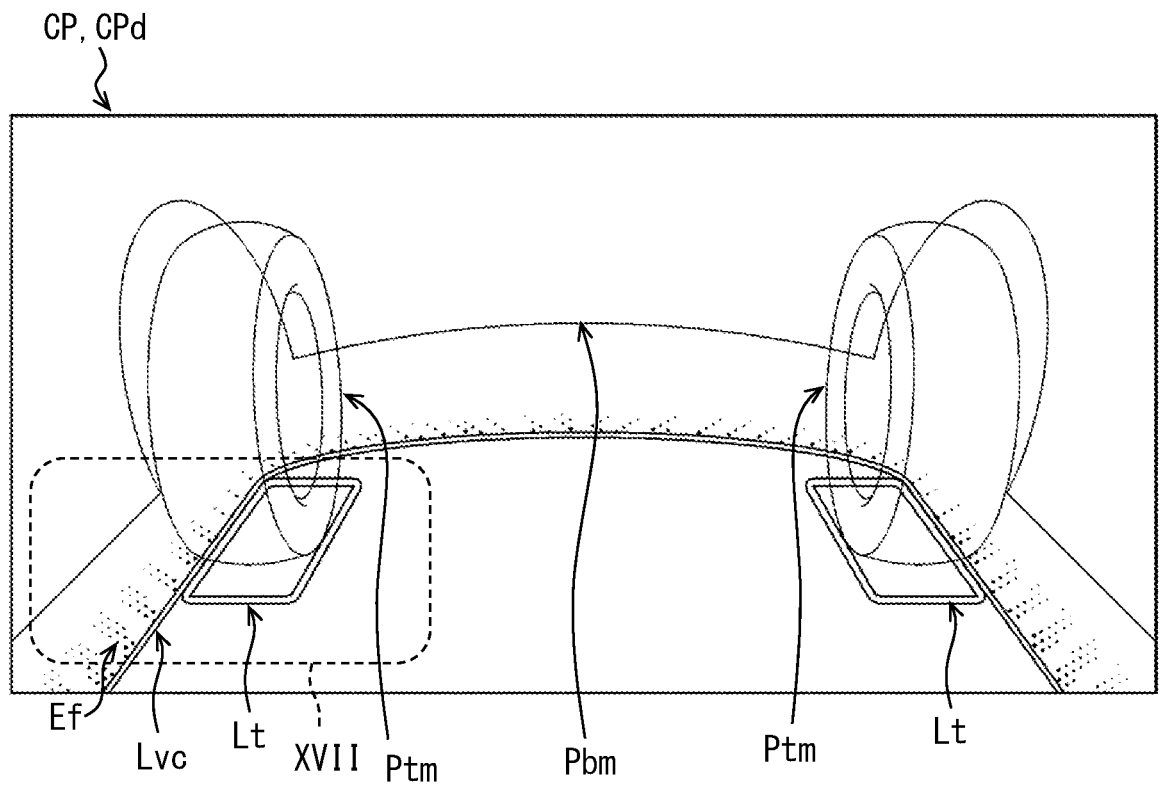
FIG. 16 is a diagram showing an example of the underfloor transparent image.
Figure 17:
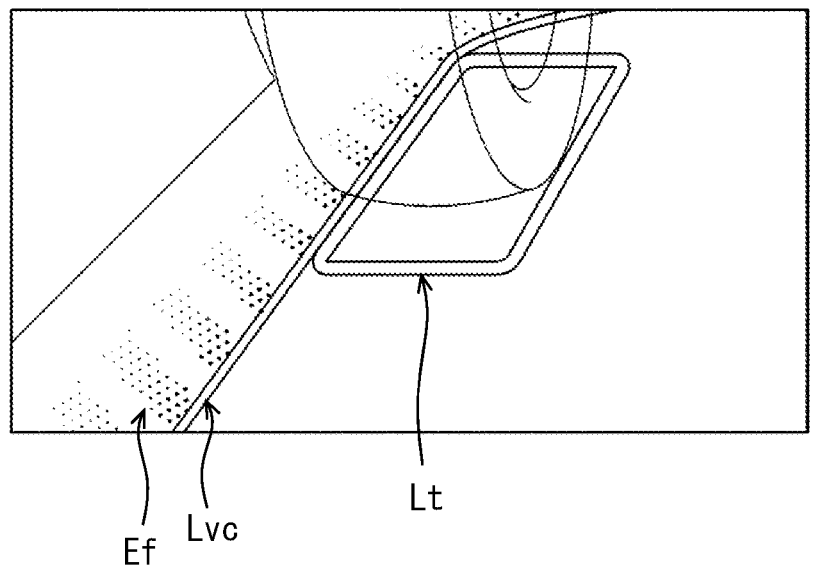
FIG. 17 is an enlarged view of a region surrounded by a broken line in FIG. 16.

Further, as shown in FIG. 15, the colored portion E1 constituting the stripe pattern may have a gradation in which the transparency is set lower as it is closer to the vehicle boundary line Lvc and the transparency is set higher as it is farther from the vehicle boundary line Lvc. For example, the transparency of a portion of the colored portion E1 connected to the vehicle boundary line Lvc is set to about 50%, and the end portion on the distant side is set to 100% or the like. FIGS. 16 and 17 show an underfloor transparent image CP that sets the driver viewpoint VPd in the case where the pattern schematically shown in FIG. 15 is applied as the decorative image Ef.

According to the configuration in which the decorative image Ef has the stripe pattern having a gradation that becomes transparent with respect to the distance from the vehicle boundary line Lvc, a portion where the camera image is hidden by the decorative image Ef is further reduced as compared with the above-described embodiment.

Figure 18:
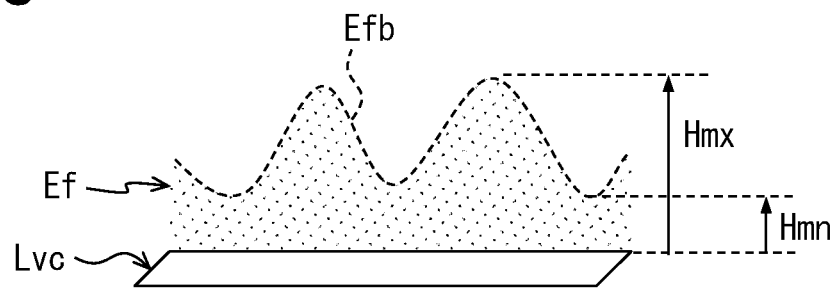
FIG. 18 is a diagram showing a modified example of the decorative image Ef.
Figure 19:
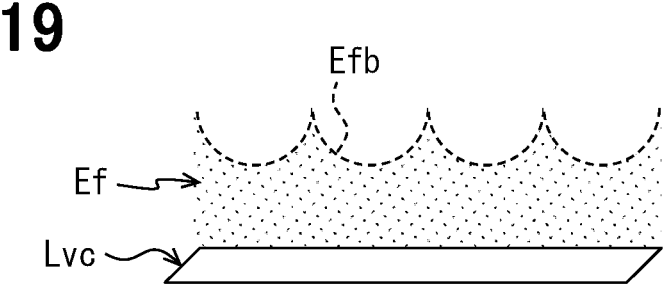
FIG. 19 is a diagram showing a modified example of the decorative image Ef.
Figure 20:
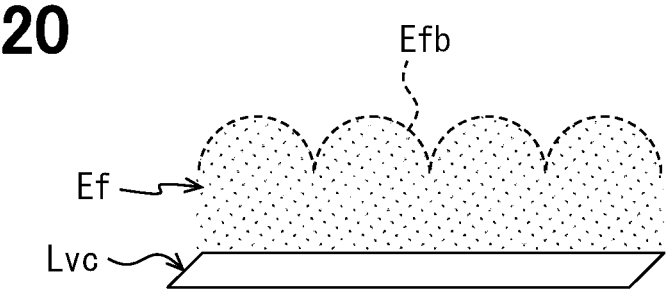
FIG. 20 is a diagram showing a modified example of the decorative image Ef.

In addition, the decorative image Ef may have a shape in which the extension length H differs depending on the location. For example, the open edge portion Efb of the decorative image Ef may be set in a wavy shape as shown in FIGS. 18, 19, and 20. The wave shape can include a so-called scallop shape in which semicircles are connected. Further, the open edge portion Efb of the decorative image Ef may have a triangular wavy shape. When the decorative image Ef has a wavy shape, the maximum value Hmx of the extension length H may be, for example, equivalent to 5 cm in the real world. Further, the minimum value Hmn of the extension length H may be 0 or may be equivalent to 2 cm in the real world.

Figure 21:
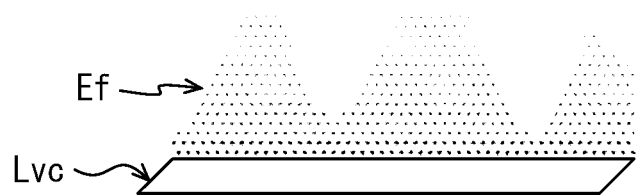
FIG. 21 is a diagram showing a modified example of the decorative image Ef.

Further, even when the decorative image Ef has a wavy shape, as shown in FIG. 21, a colored portion may have a lower transparency as it is closer to the vehicle boundary line Lvc and a higher transparency as it is farther from the vehicle boundary line Lvc. In addition, the above mentioned stripe pattern may be applied between the connecting edge portion Efa and the open edge portion Efb.

Further, when the decorative image Ef has a wavy shape as shown in FIG. 21 or the like, the height of each place may be continuously changed over time. According to such display control, the decorative image Ef moves over time, and the vehicle boundary line Lvc can be made more conspicuous. In addition, the decorative image Ef may be provided with an effect in which the colored portion fluctuates like a flame over time.

Figure 22:
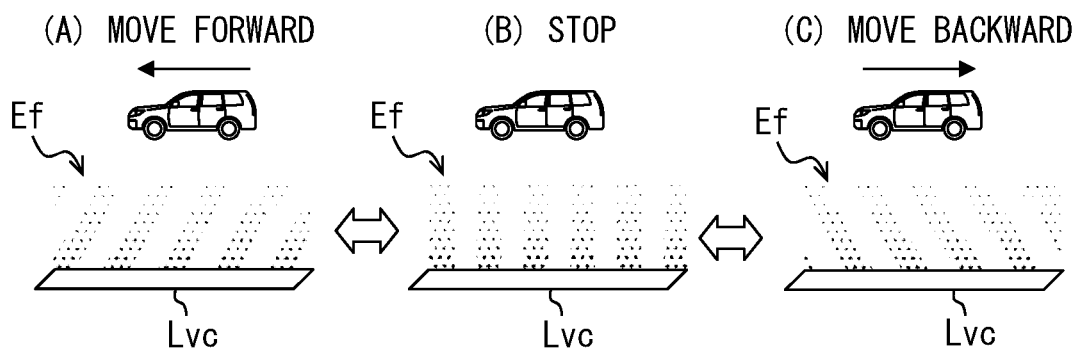
FIG. 22 is a diagram showing an example of a control mode in which displaying of the decorative image Ef is changed according to a moving state of a vehicle.

Further, when the decorative image Ef has a shape having a different height depending on the position as shown in FIGS. 14, 15, 18, and 21, the decorative image Ef may flutter with the movement of the vehicle. Specifically, in the decorative image Ef, a position of a root portion, which is a portion close to the vehicle boundary line Lvc, may not be moved, but an apex portion may be translated in the direction opposite to the traveling direction, and the images may be continuously connected between them. FIG. 22 is a diagram showing an example in which the inclination angle of the colored portion E1 is changed according to the moving state of the vehicle when the decorative image Ef has a vertical stripe pattern as shown in FIG. 15.

As shown in FIG. 22, the inclination of the colored portion E1 is changed according to the traveling direction of the vehicle V and whether or not the vehicle V is stopped. According to this configuration, the user can easily intuitively recognize the moving state of the vehicle based on the display mode of the decorative image Ef. The inclination angle of the pattern of the decorative image Ef may be adjusted according to the traveling speed. The higher the vehicle travels, the larger the inclination angle may be set. According to such a configuration, the user can recognize the traveling speed of the vehicle from the degree of inclination of the pattern of the decorative image Ef. Further, the inclination angle of the colored portion E1 may be adjusted according to the steering angle.

In addition, the composite image generation unit F7 may change the color of the vehicle boundary line Lvc according to the detection distance of an obstacle under the control of the display control unit F6. For example, when the distance to the obstacle is equal to or greater than a predetermined first distance, the color of the vehicle boundary line Lvc is set as the default color such as blue or green. On the other hand, if the distance to the obstacle is less than the first distance and equal to or greater than a predetermined second distance, the color may be changed to yellow. Further, when the distance to the obstacle is less than the second distance, the color of the vehicle boundary line Lvc may be changed to red. The first distance may be, for example, 1.0 m or 0.8 m. The second distance may be a value shorter than the first distance, and may be, for example, 0.3 m or 0.4 m. The first distance and the second distance may be dynamically adjusted according to the traveling speed. The color of the decorative image Ef may be changed so as to be linked with the color of the vehicle boundary line Lvc. For example, when the vehicle boundary line Lvc becomes yellow, the decorative image Ef becomes also a semi-transparent image based on yellow.

Further, when the distance to the obstacle is less than the first distance, the display control unit F6 may blink the vehicle boundary line Lvc at a time interval corresponding to the distance to the obstacle. In that case, the display control unit F6 may also blink the decorative image Ef in conjunction with the blinking of the vehicle boundary line Lvc, in other words, in synchronization.

The display control unit F6 may locally change the display of a portion of the decorative image Ef corresponding to the direction in which the obstacle exists. Examples of the elements constituting the display mode include size, shape, color, and transparency. For example, the display control unit F6 may make the decorative image Ef of the portion close to the obstacle longer or blink more than the other portion. Further, the decorative image Ef may vibrate in the direction in which the obstacle exists. The configuration makes it easy for the user to recognize which direction from the vehicle the obstacle exists.

In addition, whether or not to display the decorative image Ef may be switched according to the distance to the obstacle. For example, the display control unit F6 displays the decorative image Ef when the distance to the obstacle is the second distance or more. On the other hand, when the distance to the obstacle is less than the second distance, the decorative image Ef may be hidden. By hiding the decorative image Ef, when the distance is less than the second distance from the obstacle, it is possible to easily recognize the separation and the positional relationship between the vehicle boundary line Lvc and the obstacle.

In addition, in the above described embodiment, the tire boundary line Lt is not provided with decoration such as gradation, but the present invention is not limited thereto. A decorative image may also be added to the tire boundary line Lt. The decorative image added to the tire boundary line Lt may have the same color as the tire boundary line Lt. When the decorative image is added to the tire boundary line Lt, it is preferable that the colors of the tire boundary line Lt and the vehicle boundary line Lvc may be set to different colors in order to easily distinguish the tire boundary line Lt from the vehicle boundary line Lvc.

(Variations of Virtual Viewpoints)

Figure 23:
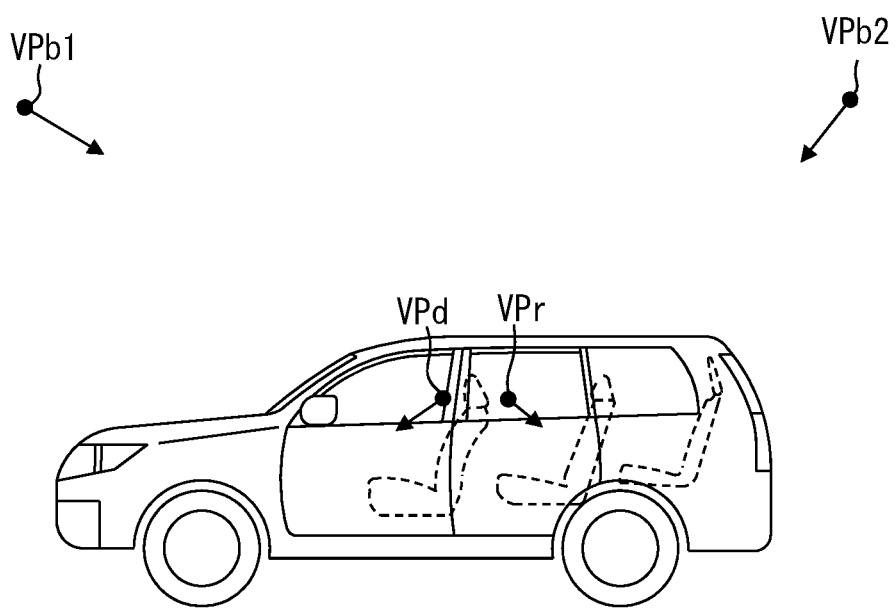
FIG. 23 is a diagram showing another setting example of a virtual viewpoint VP.

In the above, the bird's-eye view VPb and the driver viewpoint VPd have been illustrated as the virtual viewpoint VP, but the combination of positions and directions that can be set as the virtual viewpoint VP is not limited to the above example. The virtual viewpoint VP can be arranged at various positions outside the vehicle interior. For example, as shown in FIG. 23, the image generation ECU 1 may set, as the virtual viewpoint VP, a backward bird's-eye view VPb1 or a forward bird's-eye view VPb2. The backward bird's-eye view VPb1 corresponds to a virtual viewpoint VP looking down on the vehicle V and its rear from a point located in front of the vehicle above the roof of the vehicle V. Further, the forward bird's-eye view VPb2 corresponds to a virtual viewpoint VP looking down on the vehicle V and its front from a point located behind the vehicle above the roof of the vehicle V.

Further, the virtual viewpoint VP may be set at various positions in the vehicle interior. For example, as the virtual viewpoint VP, the viewpoint position may be arranged near the side mirror, in the center of the ceiling of the vehicle interior, or the like. Further, the display control unit F6 may set an indoor rear viewpoint VPr whose viewpoint position is behind the eyelips by a predetermined distance and whose visual line direction is directed diagonally backward and downward. According to such an indoor rear viewpoint VPr, the vicinity of the rear wheels can be displayed larger as the underfloor transparent image CP displayed when the vehicle is traveling backward. As a result, the configuration makes it easy for the driver to recognize the situation near the rear wheels and the rear bumper when the vehicle travels backward as well as when traveling forward.

The display control unit F6 may change whether or not to display the decorative image Ef depending on the distance between the virtual viewpoint VP and the road surface, or whether or not the virtual viewpoint VP exists in the vehicle interior. For example, when the virtual viewpoint VP is set in the vehicle interior such as the driver viewpoint VPd, the decorative image Ef is added to the vehicle boundary line Lvc. When the virtual viewpoint VP is set at a position higher than the roof such as the bird's-eye view VPb, the decorative image Ef may be hidden. In the bird's-eye view VPb, the viewpoint is far from the road surface, so even if the decorative image Ef is displayed, it is relatively small and is not very noticeable. In the bird's-eye view image, even if fine image elements such as the decorative image Ef are omitted, the influence on the user's convenience is small. Further, by omitting the display of the decorative image Ef, the processing load of the processing unit 11 can be reduced. In this way, according to the configuration in which whether or not to display the decorative image Ef is switched according to the position of the virtual viewpoint VP, in other words, according to the display mode of the composite image, the visibility of the vehicle boundary line Lvc is improved and the processing load of the processing unit 11 can be reduced.

(Obstacle Sensor)

In the above, the configuration in which the sonar 8 is used as a sensor for detecting an object existing around the vehicle (so-called obstacle sensor) has been illustrated, but the obstacle sensor may be a millimeter wave radar. Further, the obstacle sensor may be Light Detection and Ranging/ Laser Imaging Detection and Ranging (LiDAR). The image generation ECU 1 may be used by being connected to various obstacle sensors.

(Display)

In the above-described embodiment, the display 3 is provided by an in-vehicle display, but the display destination of the image generated by the image generation ECU 1 such as the underfloor transparent image CP is not limited to the in-vehicle display. The display 3 may be a display provided in a mobile terminal such as a smartphone for remotely controlling the vehicle V. Further, the display may be provided in the center for remotely controlling the vehicle V.

The device, the system and the method therefor which have been described in the present disclosure may be also realized by a dedicated computer which constitutes a processor programmed to execute one or more functions concretized by computer programs. Also, the device and the method therefor which have been described in the present disclosure may be also realized by a special purpose hardware logic circuit. Also, the device and the method therefor which have been described in the present disclosure may be also realized by one or more dedicated computers which are constituted by combinations of a processor for executing computer programs and one or more hardware logic circuits. Further, the computer program may store a computer-readable non-transitional tangible recording medium as an instruction to be performed by the computer. The methods or functions provided by the image generation ECU 1 and the like may be provided by software stored in a tangible memory device and a computer executing the software, only software, only hardware, or a combination of the software and the hardware. Some or all of the functions of the image generation ECU 1 may be configured as hardware. A configuration in which a certain function is realized as hardware includes a configuration in which the function is realized by use of one or more ICs or the like. The image generation ECU 1 may be realized by using an MPU, a GPU, or a Data Flow Processor (DFP) instead of the CPU. The image generation ECU 1 may be realized by a combination of the CPU, an MPU, and a GPU. The image generation ECU 1 may be realized as a system-on-chip (SoC). Further, for example, processing may be implemented by using a Field-Programmable Gate Array (FPGA), an Application Specific Integrated Circuit (ASIC), or the like. It should be noted that the various programs described above may be stored in a non-transitory tangible storage medium. As a program storage medium, various storage media such as Hard-disk Drive (HDD), Solid State Drive (SSD), flash memory, and Secure Digital (SD) card can be adopted.

What is claimed is:

1. A peripheral image generation device for a vehicle, comprising:
   an image acquisition unit configured to acquire a plurality of camera images obtained from a plurality of cameras each of which captures a periphery of the vehicle;
   an image storage unit configured to store a traveling direction camera image that is a part or all of images included in the plurality of camera images and captured at least in a traveling direction of the vehicle; and
   a composite image generation unit configured to generate an underfloor transparent image that is a composite image transmitting a bottom of the vehicle based on the plurality of camera images and the traveling direction camera image, wherein
   the composite image generation unit generates, as the underfloor transparent image, an image in which (i) a vehicle boundary line indicating a boundary of a range of a vehicle body and a tire boundary line indicating a boundary of a range of a tire are superimposed on an image showing a part or all of ground located under the vehicle, wherein the vehicle boundary line is a line showing a boundary of a region formed by projecting the vehicle body perpendicularly to a road surface, and the tire boundary line is a line showing a boundary of a region formed by projecting the tire perpendicularly to a road surface, and (ii) a decoration having a predetermined pattern is added to at least the vehicle boundary line, wherein the decoration is placed outside the vehicle boundary line.

2. The peripheral image generation device according to claim 1, wherein
the decoration is provided as a decorative image that has a gradation whose transparency gradually increases as a distance from the vehicle boundary line increases.

3. The peripheral image generation device according to claim 1, wherein
the decoration is provided as a decorative image that has a first part having a relatively lower transparency and a second part having a relatively higher transparency than the first part, and
the decorative image has a stripe pattern by the first part and the second part being alternately arranged.

4. The peripheral image generation device according to claim 1, wherein
the decoration is provided as a decorative image that has a stripe shape having a predetermined width and extends from the vehicle boundary line toward an outside or directly above the vehicle.

5. The peripheral image generation device according to claim 1, wherein
the decoration is provided as a decorative image that has an edge farther side from the vehicle boundary line and having a wavy shape, and
the composite image generation unit changes a height of each location in the decorative image with respect to the vehicle boundary line over time.

6. The peripheral image generation device according to claim 1, wherein
the peripheral image generation device is connected to an obstacle sensor configured to detect a three-dimensional object existing in a vicinity of the vehicle,
the peripheral image generation device further comprising:
an obstacle information acquisition unit configured to acquire a signal indicating a detection result of the obstacle sensor; and
a display control unit configured to control a display of the decoration provided as a decorative image and a display of the vehicle boundary line, wherein
the display control unit changes the display of the vehicle boundary line and changes the display of the decorative image associated with the change of the display of the vehicle boundary line in response to the obstacle information acquisition unit acquiring, from the obstacle sensor, a signal indicating that an obstacle exists within a predetermined distance from the vehicle.

7. The peripheral image generation device according to claim 1, wherein
the composite image generation unit generates the underfloor transparent image based on (i) a virtual projection surface on which data of the plurality of camera images are projected and (ii) a virtual viewpoint whose position and direction are changeable based on an instruction operation from a user,
the peripheral image generation device comprising:
a display control unit configured to control a display of the decoration provided as a decorative image, wherein
the display control unit determine whether or not to display the decorative image based on the position of the virtual viewpoint.

8. The peripheral image generation device according to claim 1, further comprising;
a display control unit configured to control a display of the decoration provided as a decorative image and a display of the vehicle boundary line, wherein
the display control unit changes the display of the decorative image according to a moving state of the vehicle.

9. The peripheral image generation device according to claim 1, wherein
the decoration is not provided inside the vehicle boundary line.

10. The peripheral image generation device according to claim 1, wherein
the decoration is not provided to the tire boundary line.

11. The peripheral image generation device according to claim 1, wherein
an appearance of the predetermined pattern varies in response to movement of the vehicle.

12. The peripheral image generation device according to claim 1, wherein
the vehicle boundary line indicates a range where the vehicle body exists on the road surface, and
the tire boundary line indicates a range where the tire exists on the road surface.

13. The peripheral image generation device according to claim 1, wherein
the vehicle boundary line indicates an outline of the vehicle body projected to the road surface in a bird's-eye view image, and
the tire boundary line indicates an outline of the tire projected to the road surface in a bird's-eye view image.

14. The peripheral image generation device according to claim 1, wherein
the tire boundary line is in a rectangular shape.

15. The peripheral image generation device according to claim 1, wherein
the decoration is added except for an inside of the vehicle.

16. The peripheral image generation device according to claim 1, wherein
the decoration is added along the vehicle boundary line.

17. A display control method that controls a display of an image for supporting a driving operation of a vehicle, the display control method comprising:
acquiring a plurality of camera images obtained from a plurality of cameras each of which captures a periphery of the vehicle;
storing a traveling direction camera image that is included in the plurality of camera images and captured in a traveling direction of the vehicle; and
generating an underfloor transparent image that is a composite image transmitting a bottom of the vehicle based on the plurality of camera images and the traveling direction camera image, wherein
the underfloor transparent image is an image in which (i) a vehicle boundary line indicating a boundary of a range of a vehicle body and a tire boundary line indicating a boundary of a range of a tire are superimposed on an image showing a part or all of ground located under the vehicle, wherein the vehicle boundary line is a line showing a boundary of a region formed by projecting the vehicle body perpendicularly to a road surface, and the tire boundary line is a line showing a boundary of a region formed by projecting the tire perpendicularly to a road surface, and (ii) a decoration having a predetermined pattern is added to at least the vehicle boundary line, wherein the decoration is placed outside the vehicle boundary line.

18. A peripheral image generation device for a vehicle, comprising:
- a processor configured to acquire a plurality of camera images obtained from a plurality of cameras each of which captures a periphery of the vehicle; and
- a memory configured to store a traveling direction camera image that is a part or all of images included in the plurality of camera images and captured at least in a traveling direction of the vehicle; wherein
- the processor generates an underfloor transparent image that is a composite image transmitting a bottom of the vehicle based on the plurality of camera images and the traveling direction camera image, and
- the processor generates, as the underfloor transparent image, an image in which (i) a vehicle boundary line indicating a boundary of a range of a vehicle body and a tire boundary line indicating a boundary of a range of a tire are superimposed on an image showing a part or all of ground located under the vehicle, wherein the vehicle boundary line is a line showing a boundary of a region formed by projecting the vehicle body perpendicularly to a road surface, and the tire boundary line is a line showing a boundary of a region formed by projecting the tire perpendicularly to a road surface, and (ii) a decoration having a predetermined pattern is added to at least the vehicle boundary line, wherein the decoration is placed outside the vehicle boundary line.

* * * * *